Sept. 13, 1955    L. C. WEATHERS    2,717,970
COMMUTATION SYSTEM FOR DYNAMO ELECTRIC MACHINES
Filed Jan. 19, 1950    10 Sheets-Sheet 1

INVENTOR.
LELAND CLAY WEATHERS
BY
*Ralph L. Truesdale*
ATTORNEY

Sept. 13, 1955 L. C. WEATHERS 2,717,970
COMMUTATION SYSTEM FOR DYNAMO ELECTRIC MACHINES
Filed Jan. 19, 1950 10 Sheets-Sheet 2

*INVENTOR.*
LELAND CLAY WEATHERS
BY
ATTORNEY

Sept. 13, 1955 L. C. WEATHERS 2,717,970
COMMUTATION SYSTEM FOR DYNAMO ELECTRIC MACHINES
Filed Jan. 19, 1950 10 Sheets-Sheet 3
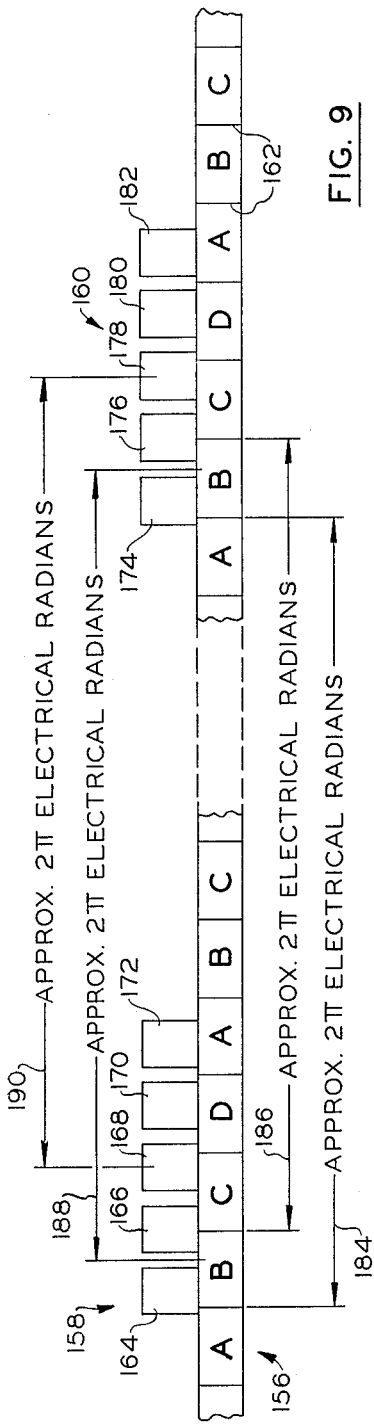
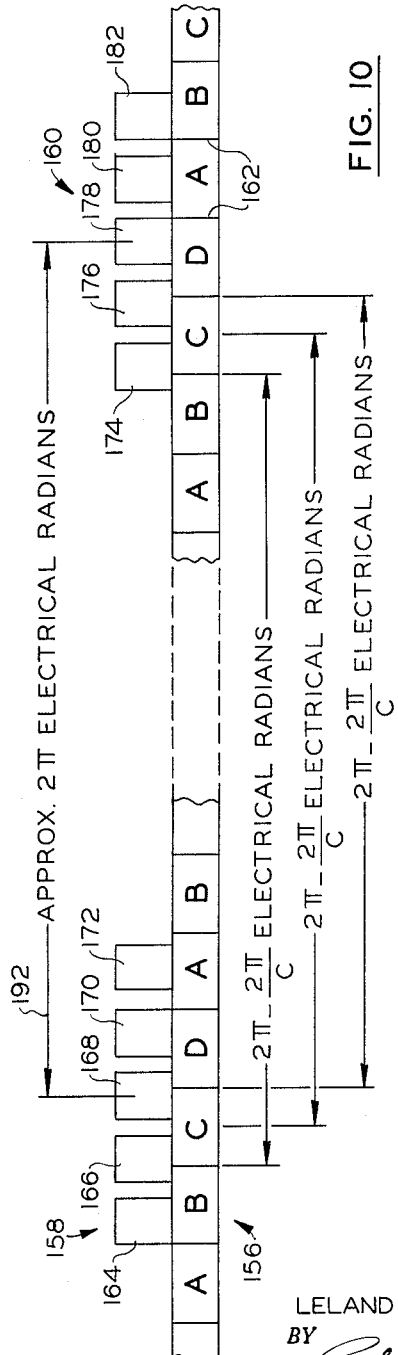
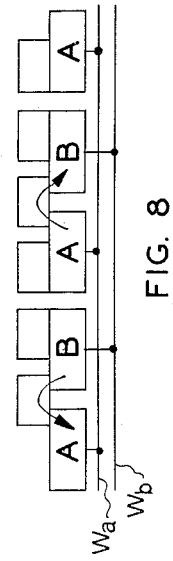
*INVENTOR.*
LELAND CLAY WEATHERS
BY *Ralph L. Tweedale*
ATTORNEY Sept. 13, 1955     L. C. WEATHERS     2,717,970
COMMUTATION SYSTEM FOR DYNAMO ELECTRIC MACHINES
Filed Jan. 19, 1950     10 Sheets-Sheet 4
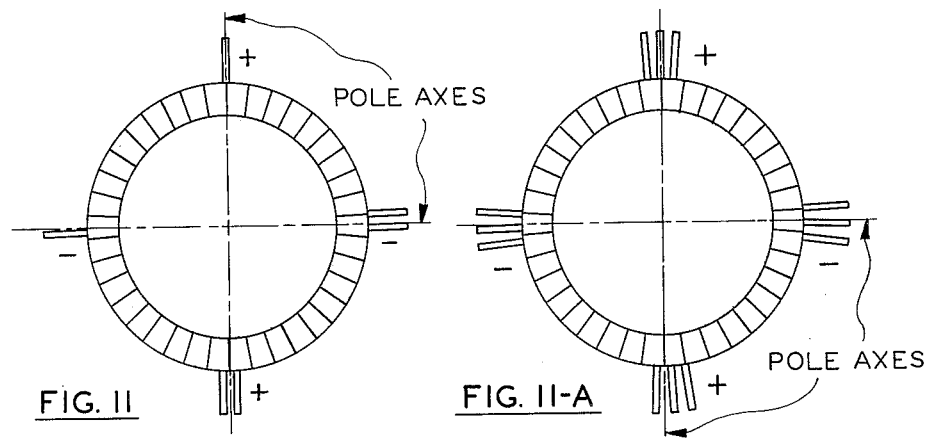
FIG. 11     FIG. 11-A
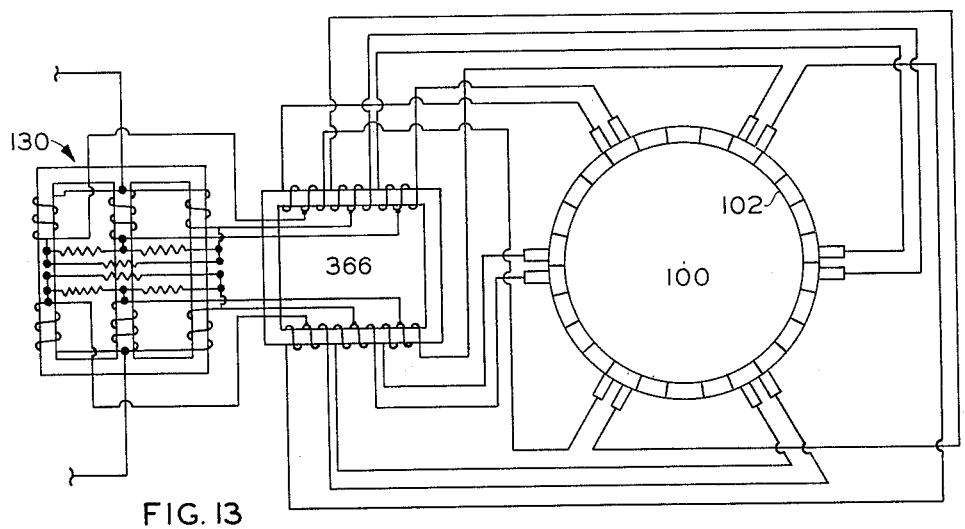
FIG. 13
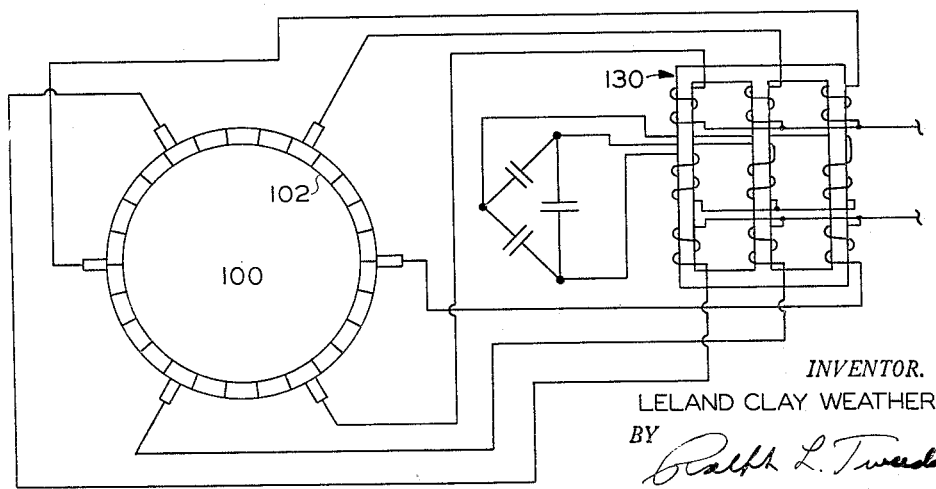
FIG. 12
*INVENTOR.*
LELAND CLAY WEATHERS
BY
ATTORNEY Sept. 13, 1955  L. C. WEATHERS  2,717,970
COMMUTATION SYSTEM FOR DYNAMO ELECTRIC MACHINES
Filed Jan. 19, 1950  10 Sheets-Sheet 5

INVENTOR.
LELAND CLAY WEATHERS
BY
ATTORNEY

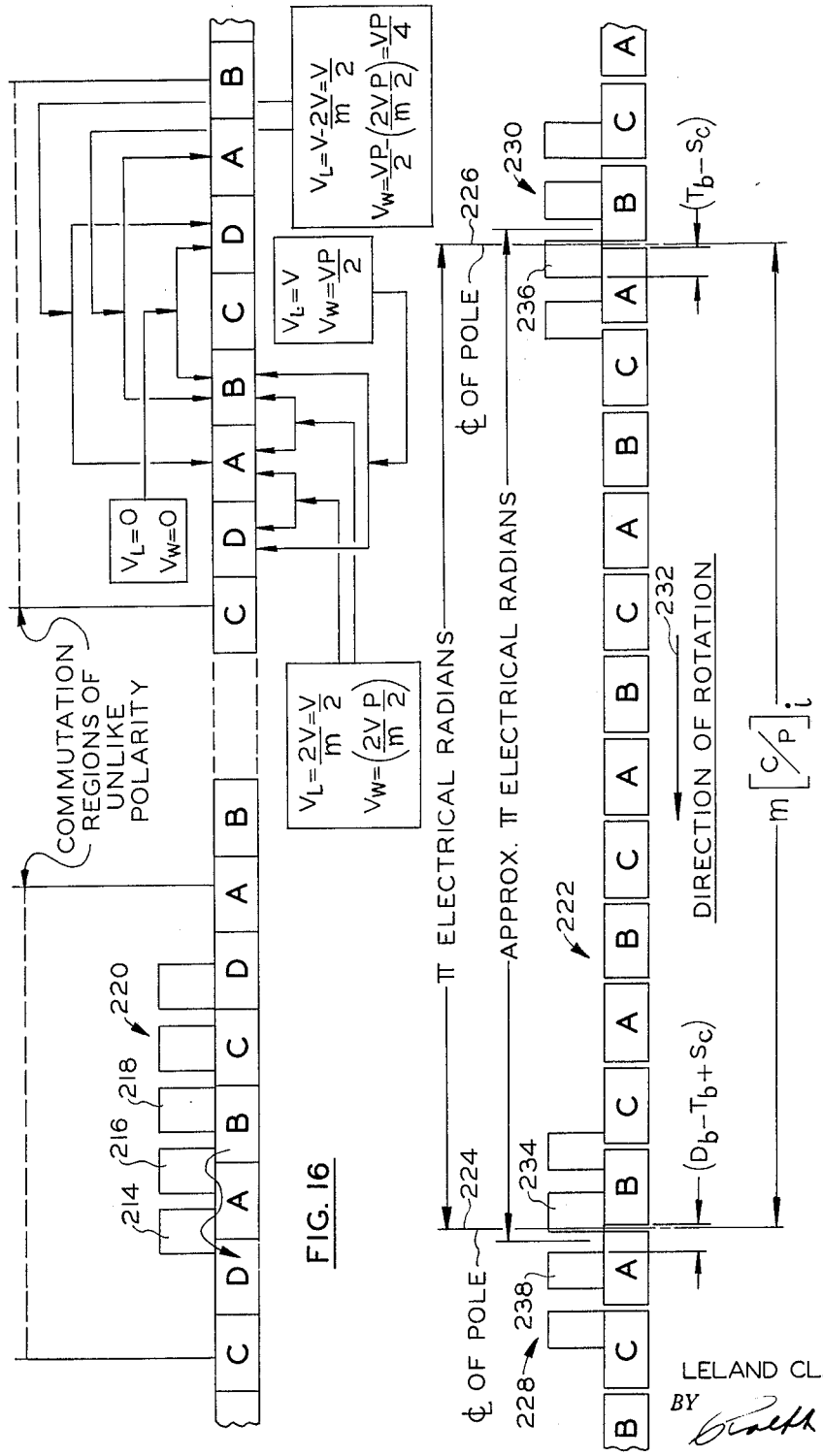

*INVENTOR.*
LELAND CLAY WEATHERS
BY
ATTORNEY

Sept. 13, 1955 L. C. WEATHERS 2,717,970
COMMUTATION SYSTEM FOR DYNAMO ELECTRIC MACHINES
Filed Jan. 19, 1950 10 Sheets-Sheet 8
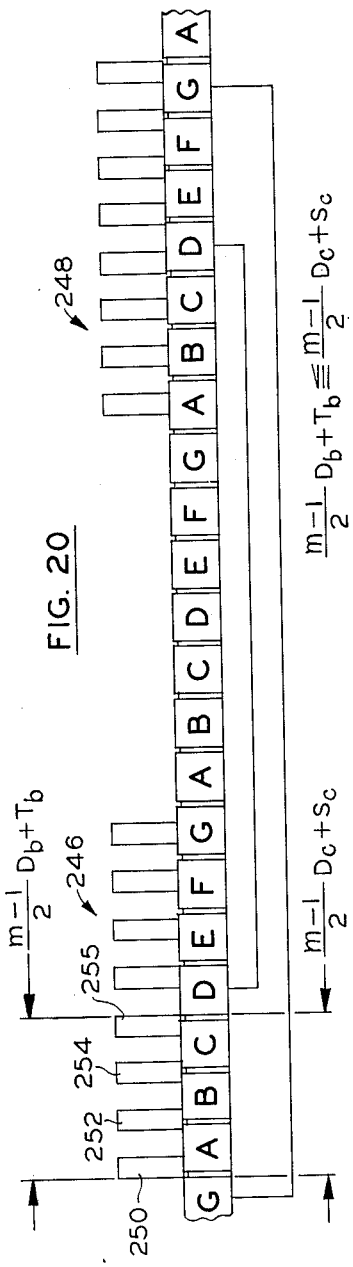
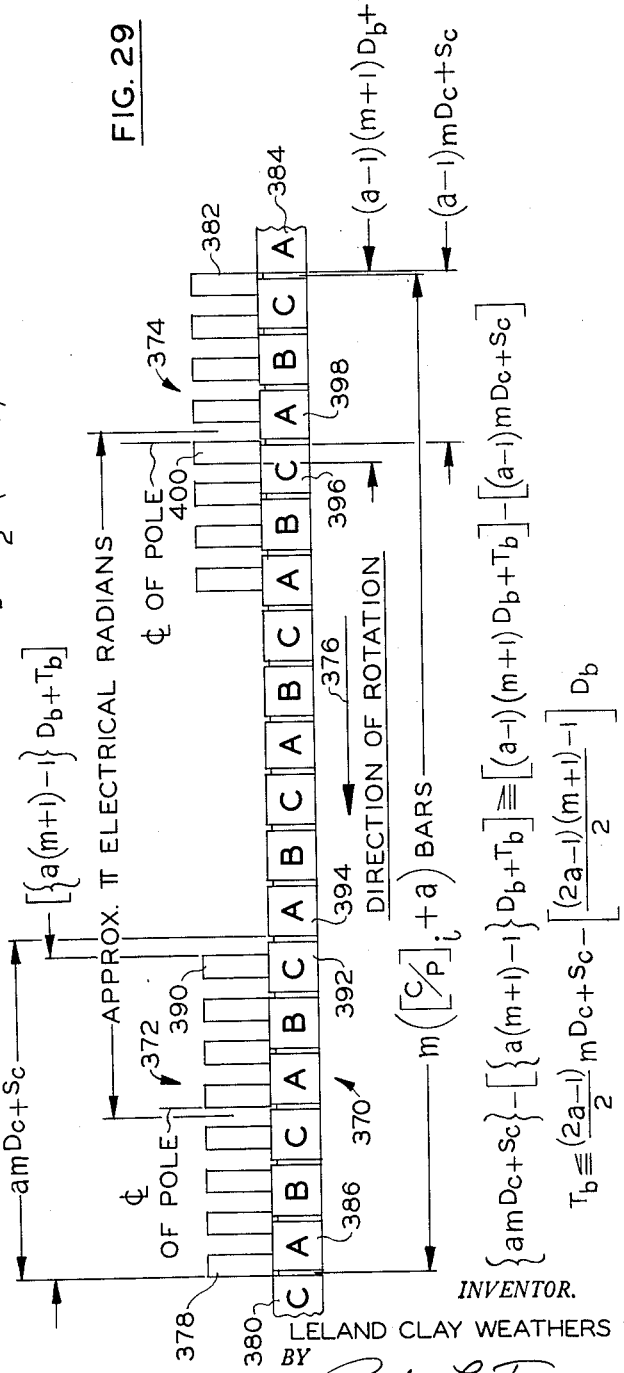
INVENTOR.
LELAND CLAY WEATHERS
BY
ATTORNEY

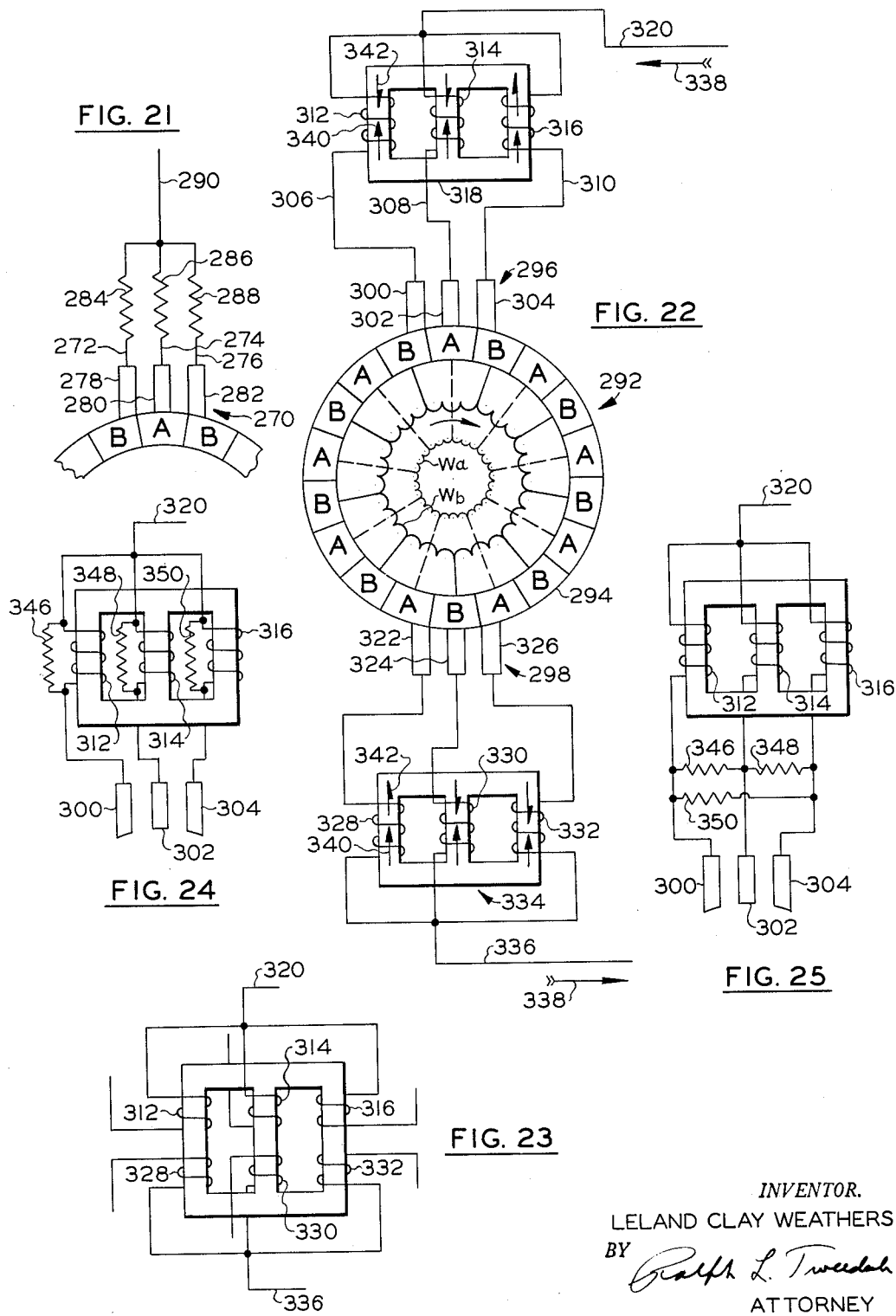

Sept. 13, 1955  L. C. WEATHERS  2,717,970
COMMUTATION SYSTEM FOR DYNAMO ELECTRIC MACHINES
Filed Jan. 19, 1950  10 Sheets-Sheet 10

INVENTOR.
LELAND CLAY WEATHERS
BY
ATTORNEY

United States Patent Office 2,717,970
Patented Sept. 13, 1955

2,717,970

COMMUTATION SYSTEM FOR DYNAMO ELECTRIC MACHINES

Leland Clay Weathers, Plymouth, Mich., assignor to Vickers Incorporated, Detroit, Mich., a corporation of Michigan Application January 19, 1950, Serial No. 139,457

36 Claims. (Cl. 310—225)

This invention relates to power transmission, and more particularly, to a commutation system for preventing flow of short circuit currents in armature coils undergoing commutation in a rotating dynamoelectric machine of the commutator type.

While the commutation system of the present invention has utility in any type of electric machine having brushes engaging a commutator it has particular utility in alternating current commutator type machines, since such machines present the most difficult commutation problems. In alternating current machines of the commutator type the armature is rotated in an alternating field. Not only are speed voltages induced in the coils of the armature windings, but transformer voltages, absent in direct current machines, are also induced in the armature windings. The speed voltages are induced by movement of the conductors of the armature coils through the mutual flux when the armature is rotated while the transformer voltages are produced by transformer action due to the alternating flux cutting the conductors of the armature winding whether the armature is stationary or rotating. In general, the speed voltages are a maximum in coils which are spaced around the armature 90 electrical degrees from the coils in which the transformer voltages are a maximum. If brushes contact the commutator so as to short circuit any armature coil or coils having any substantial voltages induced therein, whether such voltages be speed voltages or transformer voltages, large undesired armature circulating currents flow through such coils and brushes. All the aforementioned short circuits are inductive since they include armature coils and the rapid and repeated opening of such circuits during commutation causes sparking and arcing at the commutator, resulting in rapid deterioration of the brushes and commutator. Also in certain types of alternating current commutator machines, the circulating currents react upon the excitation circuit to interfere with proper operation of the machines.

Since the early days in development of commutator type of electrodynamic machinery, designers have been aware of these short circuits which exist whenever a brush is in contact with two or more commutator bars and they have constantly striven to alleviate it. It has been an almost universal practice commercially to achieve a compromise by using a brush material having sufficient resistance to partially block the circulating currents and at the same time not impede the flow of power current too much. In the early years much attention was also given to more intricate commutating systems using very narrow brushes in relation to the commutator bar width in the hope of mechanically eliminating the possibility of short circuits under the brushes and their consequent damaging circulating current.

These efforts are exemplified in the patent to Fornander, No. 1,059,134 dated April 15, 1913. The commutation system there disclosed utilizes a plurality of narrow brush segments or elements closely spaced but insulated from each other and occupying an arc comparable to the arc spanned by a conventional solid brush. The armature utilizes a multiplex winding, that is, two or more independent windings with the commutator bars connected alternately or in rotation to separate windings so that no two adjacent bars are connected to the same winding. In this way, the bridging of the gap between two adjacent bars by a single brush segment avoids the formation of a short circuit through a single coil of any of the multiplex windings. Certain other short circuits through the armature coils from one brush segment to another were taken care of by providing some form of impedance network connecting all the brush elements at one commutation region to each other and to the power supply.

In spite of the ingenuity of the efforts along these lines in the prior art, such constructions continued to give difficulty with sparking at the commutator when used in alternating current machines, and, in fact, gave little if any improvement over conventional construction in direct current machines. Although many such proposals were made during the years when the development of alternating current rotating machinery was receiving its greatest impetus, still none of them achieved any commercial success and the art long ago abandoned further attempts along this line. Consequently, for many years now in spite of the preponderant availability of alternating current over direct current, the user, who, for example, requires an adjustable speed shunt motor, must use one which operates on direct current and must then purchase expensive conversion equipment to convert his alternating current supply to direct current.

The present invention represents an improvement over the prior art just discussed. It employs brush structures made up of a plurality of brush elements insulated from each other and having separate external connections in conjunction with a plurality of armature windings connected to different sets of commutator bars. In addition to substantially preventing flow of detrimental circulating currents, however, the present invention provides for correct distribution to the various armature windings of the armature power current or other current, such as, exciting current, which flows through the armature and external circuits connected to the armature winding through the brush structures and commutator. The present invention also provides for substantial reduction in diameter of the commutator due to wear or reconditioning of the commutator without interference with the operation of the commutation system. In realizing these accomplishments, it has been found that the segmented brushes and multiplex armatures, disclosed in the prior art discussed above, although effective to prevent some of the circulating currents present in conventional commutator constructions, yet they do permit many detrimental types of circulating current to flow in rather involved paths through the intricate brush structure and armature windings. Some of these paths involve a plurality of brush segments in a single commutation region together with the coils of two or more of the independent windings. Other paths involve brush segments in each of two or more commutating regions, both of like or of unlike-polarity, and they include either a single armature winding or more than one.

The present invention has been evolved by an analysis of all of these possible paths for detrimental circulating current, and by the development of the mathematical relations determinative of the limits of those factors such as brush width and spacing, and bar width and spacing which enable all detrimental circulating current to be avoided and at the same time properly distribute power current to the armature windings equally as well as any conventional commutator system. These mathematical relations, moreover, have been developed for the general case, that is to say they are not limited to any particular configuration or design arrangement and not confined to any particular number of poles, number of windings, number of coils per winding, etc.

Rotating electrical machinery designed in accordance with these relationships is therefore free from deleterious and destructive sparking at the commutator and for the first time makes practical the use of a commutator in any type of alternating current machine.

Further objects and advantages of the present invention will be apparent from the following description, reference being had to the accompanying drawings wherein a preferred form of the present invention is clearly shown.

In the drawings:

Figure 8 is similar to Figures 2 to 7 and illustrates a closed circuit between an equal number of coils in two windings formed by the same relative brush elements of two basic groups forming one brush. In Figures 2 to 8, the armature coils are indicated by straight lines connected between sequentially spaced bars.

Figures 9 and 10 illustrate a commutator with brushes of like polarity spaced to prevent the formation of junctions simultaneously by brush elements of like polarity which would produce undesirable internal circulating current between brushes of like polarity. Figure 9 represents a lap wound armature and Figure 10 a wave wound armature.

Figure 11 shows a four-pole wave wound duplex doubly re-entrant armature with only $(m+1)$ brush elements per set, the brushes of unlike polarity being dissymmetrically spaced from each other.

Figure 11a is another four-pole example of brush dissymmetry and is applicable to either a wave or lap winding, for the wave there being $2(m+1)$ brush elements per set, and for the lap $(m+1)$ brush elements per set.

Figures 12 and 13 illustrate the same wave wound armature shown in Figure 1 but with one and two brush elements per brush position, respectively, i. e., $(m+1)$ and $2(m+1)$ brush elements per set, respectively. Each of Figures 1, 12, and 13 illustrate a different brush impedance network.

Figure 14:
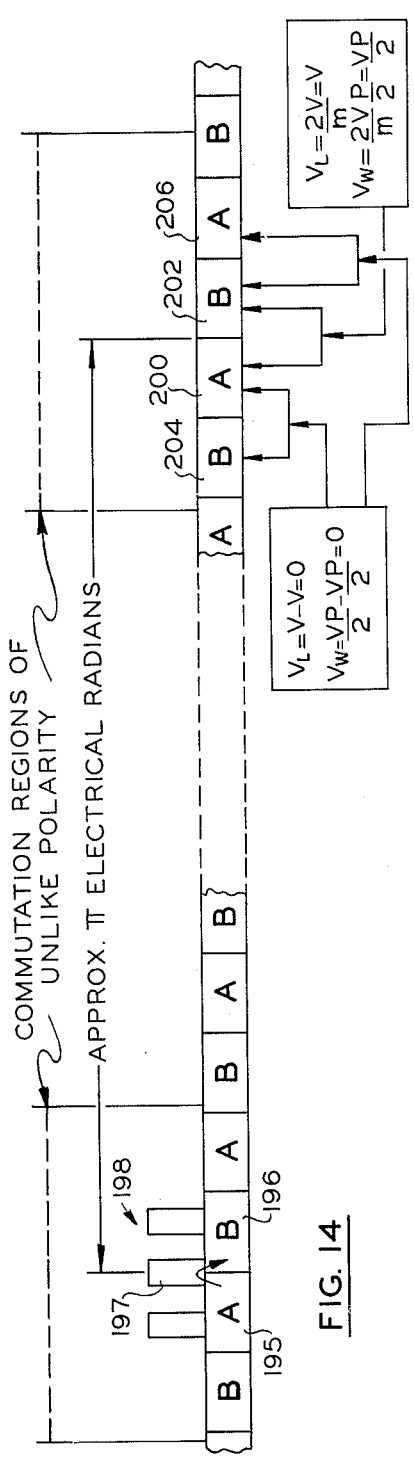
Figure 15:
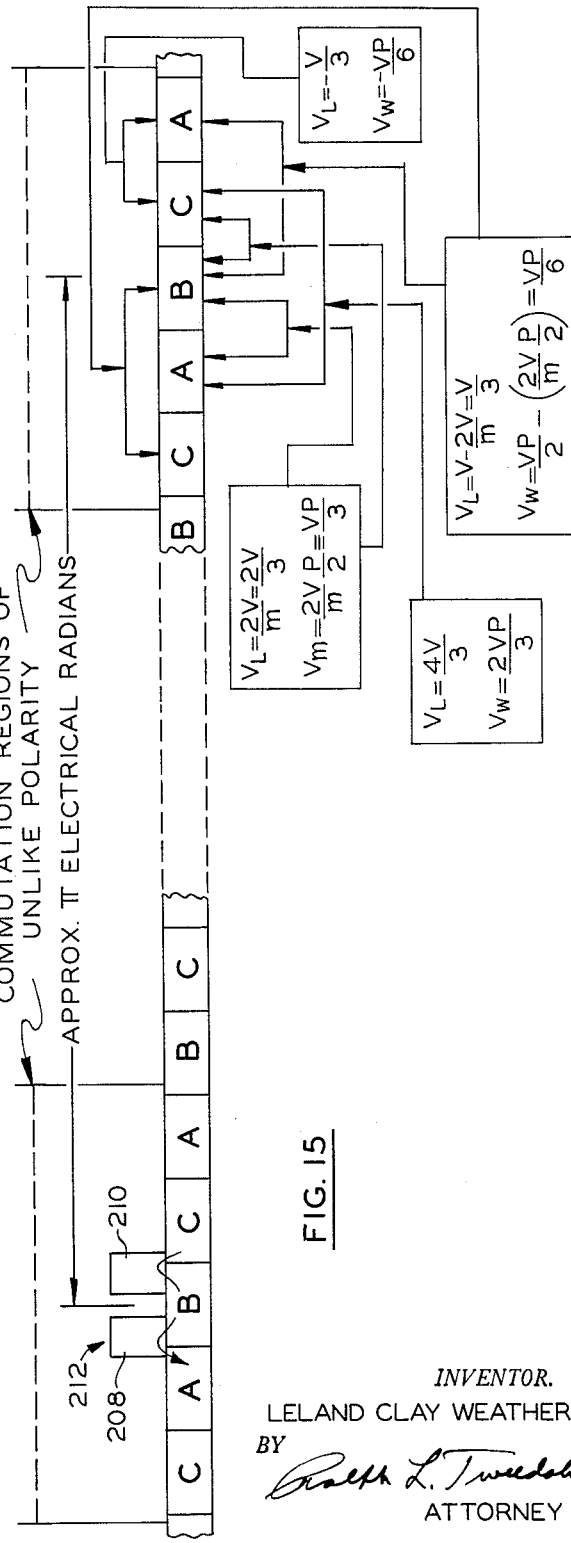

Figures 14, 15, and 16 are diagrams indicating the voltage relations between commutator bars in a commutation region of one polarity when the bars are joined in like or unlike order by brush elements in a commutation region of opposite or unlike polarity.

Figure 17 is a diagram illustrating the evolution of brush proportions and spacing relations for preventing the simultaneous formation of like order junctions by brush elements of unlike polarity which would be productive of undesirable internal circulating currents.

Figure 18:
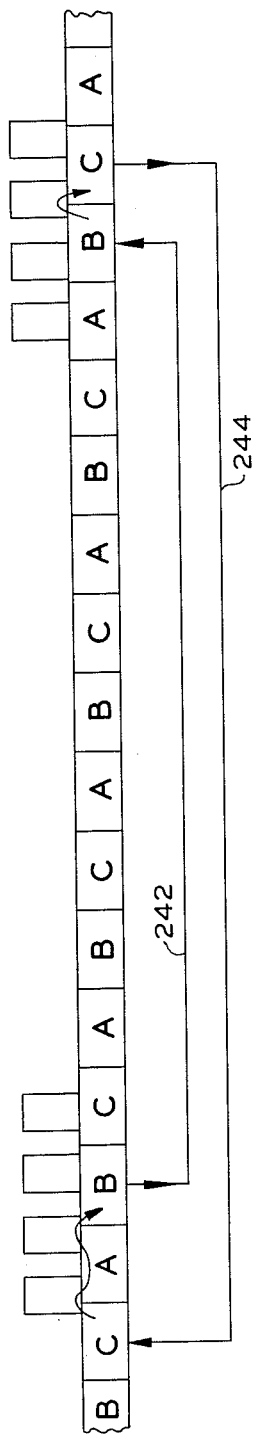
Figure 19:
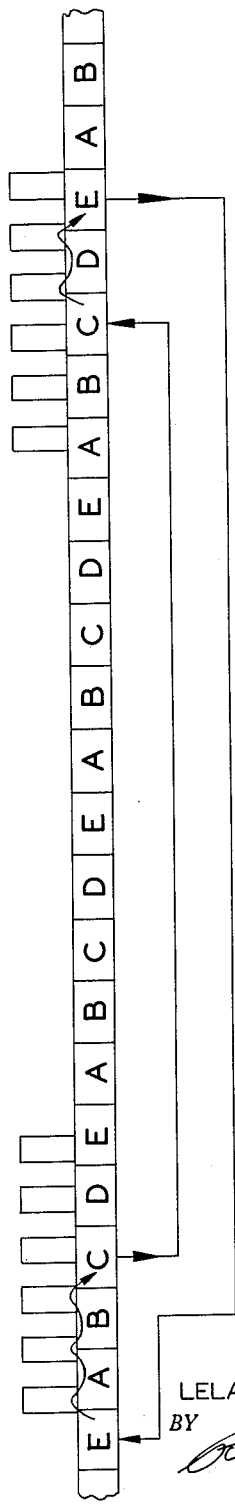

Figures 18 and 19 are diagrams showing closed circuits which may be formed in armatures having an odd number of independent closed windings due to the formation of unlike order junctions by brush elements of unlike polarity.

Figure 20 is a diagram illustrating the evolution of the brush element relations for eliminating short circuits of the type illustrated in Figures 18 and 19.

Figure 21 is a diagram illustrating the use of resistors only in a brush impedance network for reducing the flow of external circulating currents between brush elements of like polarity.

Figure 22 shows a two-pole lap wound armature with a brush impedance network.

Figures 23 to 27 inclusive illustrate variations of brush impedance networks.

Figure 28:
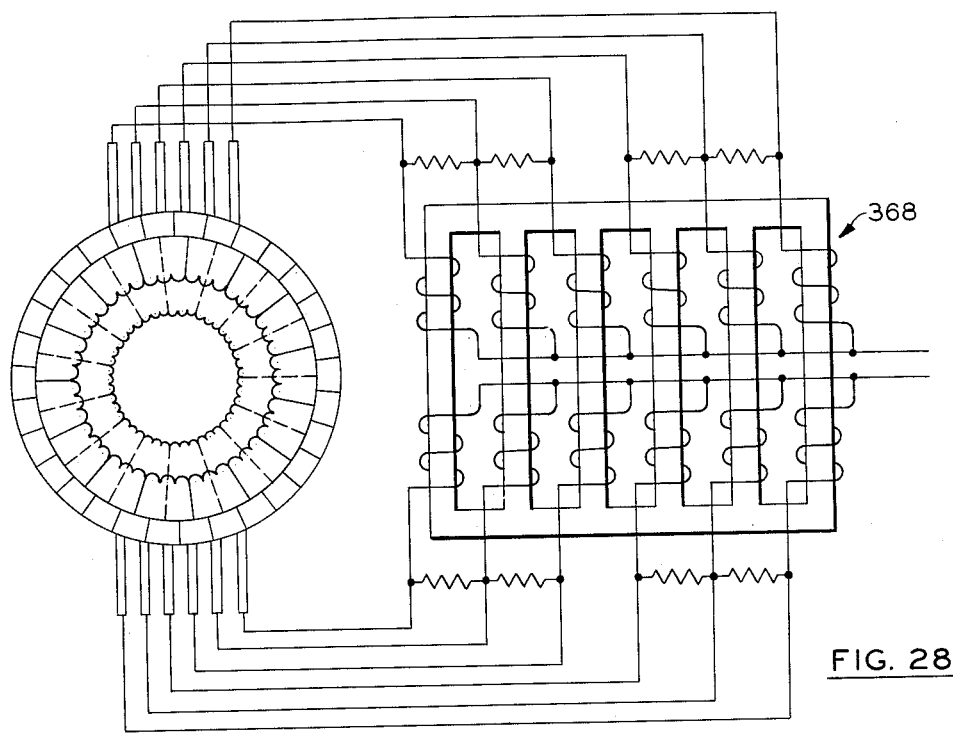

Figure 28 is a diagram of a two-pole lap wound armature having $2(m+1)$ brush elements per set and another variation of a brush impedance network. In this figure, the commutator is unworn and the brushes are proportioned and spaced to compensate for about 5 per cent commutator wear.

Figure 29 is a diagram of a commutator illustrating the rule for placement and proportion of brushes of unlike-polarity in order to prevent the simultaneous formation of like order junctions between bars of the same windings by brush elements of unlike polarity where commutator wear is to be compensated for.

In order to avoid complex detail, most of the drawings show only portions of complete structures, for example, armature coils are omitted in some of the drawings and only representative groups of brush elements have been shown. Also, to avoid detail, the armature coils connected between commutator bars are indicated in some cases by straight lines, coiled lines, or combinations thereof. It will be appreciated that poles are generally located in line with the brush structures, but not necessarily so. Although most of the figures show only portions of a structure, yet it is believed that they will be understood by those skilled in the art to be a part of complete electrodynamic structures.

With regard to references herein to brushes of one or another polarity, or to the polarities of poles, it will be appreciated that they are usually fixed in direct current machines, but in alternating current machines, the polarity of any one of these components may alternate or reverse periodically. Thus, reference to polarity is relative and is intended to cover both fixed relations and instantaneous relations with regard to polarity.

Practical commercial armature windings in commutating type machines fall within two general classes: lap windings and wave windings. Although these types of windings are well known in the art, it is well to briefly review a number of their respective characteristics which must be considered in evolving the general structural relations of the commutation system of the present invention.

The ends of each coil of a simplex lap winding are connected to adjacent commutator bars separated only by an insulating space usually occupied by a mica separator. The insulating space between adjacent commutator bars may be referred to as a commutator slot or bar spacer. Each pair of poles creates a pair of current paths in a lap winding resulting in a plurality of parallel circuits and requires that there be as many commutating regions (where one or more brushes are located) as there are poles.

In a simplex wave winding, adjacent commutator bars are connected to as many coils in series as there are pairs of poles, each coil in the series connection being acted upon by a different pair of poles at a given time. For example, in a six pole machine, three coils in series are connected between adjacent commutator bars and are disposed around the armature in such a manner that each coil can be acted upon by a different pair of poles at a given time. The simplex wave winding being a series winding has only two current paths regardless of the number of poles and requires only one pair of commutating regions for any number of poles. However, additional commutating regions properly disposed around the commutator may be used. Where only two are used, the breaking of contact between a brush and a commutator bar interrupts the inductive kick of as many coils in series as there are pairs of poles. However, if a pair of commutating regions is provided for each pair of poles, then the inductive kick as a bar leaves a brush is due to one coil only. Since the simplex wave winding has only two current paths, all the brushes of like polarity may be considered collectively one brush set whether the total number of such brushes is one or more. All $m$-re-entrant wave windings, where $m$ is the number of independent closed windings, in order to close on themselves symmetrically in front of or behind the starting bar must satisfy the wave winding formula, $$C = \left(\frac{PN}{2} \pm 1\right)$$

wherein P is the number of poles, N is any integer, and C is the number of coils in each separate closed winding.

In the conventional simplex armature winding, whether wave or lap, the ends of each coil or coil group of the winding are connected to adjacent commutator bars and each brush spans more than a commutator slot to contact at least two adjacent bars simultaneously, thereby affording continuity of the power circuit. Since a brush contacts at least two adjacent bars, a coil undergoing commutation is short circuited by a brush, causing a circulating current to flow in the closed coil circuit which together with the inductive kick of the coil causes sparking or arcing between the brush and the commutator bars.

Voltages induced in armature coils in alternating current machines are from a number of sources. The major induced voltages are speed voltages and transformer voltages. Speed voltage is induced by the armature coil conductors moving through the air gap flux and is proportional to the speed of armature rotation assuming that the field is stationary in space. Transformer voltage is produced by transformer action in alternating current machinery having a stationary field and is due to the field flux linking the armature coils whether the armature is stationary or rotating. Coils undergoing commutation for receiving power current have maximum transformer voltages induced therein, while the induced speed voltage is a minimum in these coils. There is also the voltage of self-induction at commutator bar frequency due to the reversal of the operating current through the coils undergoing commutation.

Injurious armature circulating current that can be caused by brush-commutator bar contact in a machine having a plurality of independent armature windings and segmented brush sets may be divided into two classes: internal and external. Internal circulating currents are caused by the direct shorting of armature coil and winding circuits by brushes contacting commutator bars connected to the coil and winding circuits. Such direct short circuits can involve one or more coils, one or more windings, two or more brush elements, and one or more brush sets. Thus, internal circulating currents are caused by direct short circuits under brush elements and these currents will flow whether the brush elements are connected to an external circuit or not.

The external circulating current flows from the coil or coils to a bar, to a brush element, through an external circuit or connection, and back through another brush element of the same polarity, and another commutator bar to the coil or coils.

Short circuit conditions which can cause internal circulating current may be classified as follows:

(1) Those caused by brush elements of only one polarity which for convenience are referred to as like-polarity short circuits and which are further subdivided into (a) Simple like-polarity shorts which in a lap winding is a coil shorted on itself and in a wave winding may be two or more coils with two or more coil voltages in series aiding shorted together. This is the type of short which is prevalent in a conventional simplex winding wherein a solid brush contacts two adjacent bars and shorts the coil or coils connected between the bars. In the machines concerned with herein, i. e., machines having multi-element brushes and multiple independent windings, simple like-polarity shorts can be caused, where separate brush elements contact separate bars connected to the respective ends of one coil, by the overlapping contact of brush elements and bars intermediate the brush elements in contact with the bars connected to the coil ends.

(b) Complex like-polarity shorts which involve coils in separate independent windings such as two coils of one winding being shorted across one coil of another winding with bucking voltages resulting in one coil voltage causing circulating current to flow in three coils in series. Complex like-polarity shorts may occur solely at one brush position and also when brushes of the like polarity, but at different positions around the commutator, contact the commutator bars.

(2) Direct short circuits referred to herein as unlike-polarity shorts involve combined commutator bar contact by brush elements of both polarities and more than one winding to cause current to flow through the armature from brushes of one polarity to brushes of opposite polarity. Although these circulating currents, like the power current, flow between brushes of unlike polarity, the average torque produced by these currents which flow back and forth through the armature is zero.

All the aforementioned short circuits are inductive since they include armature coils, and the rapid and repeated opening of such circuits during commutation causes sparking and arcing at the commutator resulting in rapid deterioration of the brushes and commutator. Also, in certain types of alternating current machines the circulating currents react upon the excitation circuit to interfere with proper operation of the machines.

Previous proposals in the prior art have not taken into consideration or eliminated complex like-polarity shorts and unlike-polarity shorts and have not been adequate to properly distribute the armature current to the various armature windings, nor have they been capable of preventing injurious short circuits by the brush structures when the diameter of the commutator has been reduced as by wear.

As outlined above, the mere use of segmented brush sets and multiple independent windings introduces a number of new conditions which will cause short circuits of armature coils and windings by the brush sets, and for this reason, the number of brush elements per set, the spacing of the sets, and the brush element thickness and spacing relative to the commutator bar width and spacing cannot be freely or haphazardly chosen. The present invention contemplates the correlation of the above structural factors in such ways that short circuits under the brushes which would produce injurious circulating currents may be substantially eliminated in any commutating dynamo-electric machine. In addition, external circulating currents are substantially restricted by restrictive devices between brush elements of like polarity, and forced current reversal together with a proper distribution of operating current, is substantially obtained.

In accordance with one embodiment of the invention, these results are obtained by employing a plurality of independent armature windings connected to different sets of commutator bars together with segmented brushes made of a given minimum number of brush elements per set insulated from each other and having separate external connections which connect brush elements of like polarity through devices which restrict the flow of external circulating current. A given minimum number of brush elements per set, dependent on the number of independent windings, is provided in order to operate all of the windings all of the time and to secure proper operating current distribution. Like-polarity short circuits caused at only one brush position are substantially eliminated by proper correlation of brush element thickness and spacing with commutator bar width and spacing. Like-polarity shorts between separate brush positions of like polarity, and unlike-polarity shorts are substantially eliminated by a specially related spacing between the brush elements at one brush position and the brush elements in another brush position which spacing substantially prevents brush elements located at different brush positions from forming a closed circuit, productive of internal circulating current, between two otherwise independent windings.

The present invention is not confined to rotating machinery or to any particular form of commutator. The principles of the invention may be applied to linear flat-face commutators such as used in brush tap transformers, and to the various types of rotating commutators such as cylindrical, circular flat-face, etc. In straight or circular flat-face commutators, the relative proportions and spacing of brush elements and commutator bars do not ordinarily change with wear. Wear is a practical problem in the cylindrical commutator because the changing diameter of the commutator changes relative proportions and spacing of the brush elements and bars. Parallel brush segments and radial brush segments are each treated differently when considering wear allowance. However, the various relations and relative measurements disclosed herein are referred to the working surfaces of the commutator and of the brush elements, and for any fixed size of diameter of commutators, the relative surface relations will be the same whether the commutator is flat-faced or cylindrical and wear allowance can be made where necessary with due regard being taken to the type of brush segments (parallel or radial) used.

Figure 1:
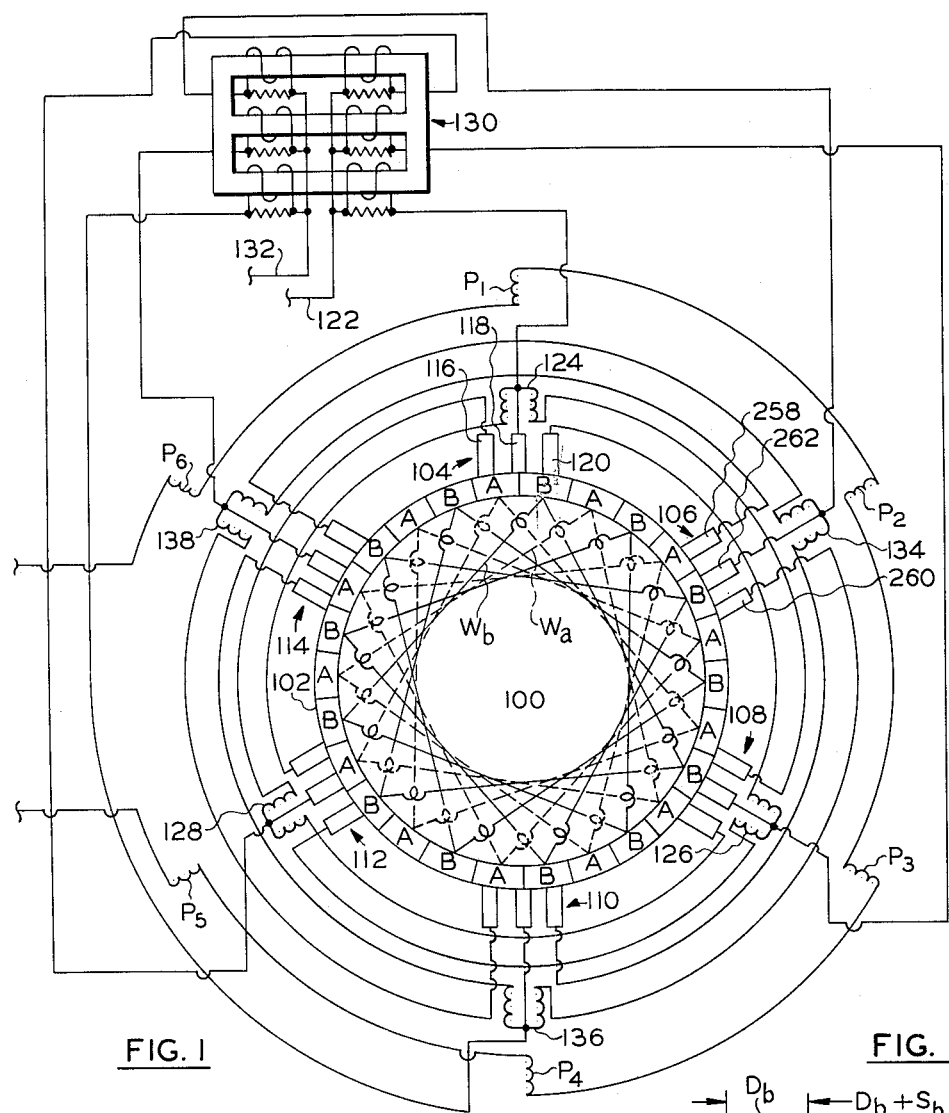
Figure 1 is a diagram of one embodiment of the invention.

A commutation system for a six pole dynamoelectric machine is shown in Figure 1. This is primarily for illustration of the principles involved rather than a representation of a practical device. The coils of each of two independent closed armature windings $W_a$ and $W_b$ of a wave wound armature 100 are connected to sequentially spaced commutator bars A and B of a commutator 102, the sequence being every $m$th bar, where $m$ is the number of independent armature windings. Winding $W_a$ is connected to the A bars while winding $W_b$ is connected to the B bars. The axes of adjacent coils of any two adjacent windings in any of the examples described and shown herein are separated by substantially the same angle as centers of adjacent commutator bars. The six field poles are indicated at $P_1$, $P_2$, $P_3$, $P_4$, $P_5$, and $P_6$, and are symmetrically spaced around the armature. Poles $P_1$, $P_3$, and $P_5$ are of one polarity, and poles $P_2$, $P_4$, and $P_6$ are of opposite polarity.

Six segmented brushes 104, 106, 108, 110, 112, and 114 contact the armature in commutation regions centered $\pi$ electrical radians apart. Brushes 104, 108, and 112 are of one polarity, while the brushes 106, 110, and 114 are of opposite polarity. Each brush is made up of three brush elements insulated from each other and having separate external connections joined to a common conductor through an impedance network, which, while providing substantially free flow of operating or power current into and out of the armature, will restrict flow of external circulating current between brush elements contacting bars connected to the same winding.

The brush elements of each brush are so proportioned and spaced relative to the commutator bars that they cannot short circuit bars connected to the same winding. For example, brush 104 has three brush elements 116, 118, and 120 so proportioned and spaced that no combination of commutator position with these brush elements can, by overlapping contact, form a short circuit between bars connected to the same winding which would be productive of internal circulating current.

All the brush elements of brushes of one polarity, for example, the elements of brushes 104, 108, and 112 are connected to a common armature conductor 122 through an impedance network including center-tapped reactors 124, 126, 128, and a three-legged reactor 130. The brush elements of the brushes of opposite polarity, 106, 110, and 114, are connected to a second common armature conductor 132 through center-tapped reactors 134, 136, and 138, and the three-legged reactor 130.

The relation between the number of independent armature windings, the number of coils, and the number of poles is such that the brushes may be symmetrically spaced as indicated without causing injurious internal circulating currents to flow between brushes of like polarity and between brushes of unlike polarity. These relations have been developed in accordance with the rules more fully explained hereinafter.

In order to simplify the understanding of the various relations required to substantially eliminate the detrimental direct short circuit conditions which could arise under the brushes, the elimination of the following conditions will be treated in the order named.

(1) Simple like-polarity short circuits caused at one commutation region only by one segmented brush.

(2) Complex like-polarity short circuits caused by the coaction of brush elements of like polarity but in different commutating regions.

(3) Unlike-polarity short circuits caused by the coaction of brush elements of unlike polarity.

*Short circuits at one brush position*

The required relations to prevent flow of internal circulating currents due to short circuits at one commutating region for any value of $m$ ($m$=number of independent windings) are illustrated in Figures 2 to 7, inclusive. Although these figures show lap windings, the relations are equally illustrative and valid for a wave winding, the difference being that in a wave winding two or more coils are connected in series between two successive bars of one winding depending on the number of pairs of poles on the wave wound machine. In these figures, the separate windings are denoted by W with the proper alphabetical subscript associated with the lettered bars. For example, winding $W_a$ is connected to the A bars, winding $W_b$ is connected to the B bars, winding $W_c$ is connected to the C bars, and winding $W_d$ is connected to the D bars. Each view, therefore, shows a plurality of independent windings whose coils are connected to sequentially spaced bars of the commutator, the sequence being every $m$th bar, with bars of the other windings disposed therebetween.

In Figures 2 to 7, inclusive, $D_b$ is the distance between the centers of adjacent brush elements at the commutator surface.

$S_b$ is the gap between adjacent brush elements at the commutator surface.

$D_c$ is the distance between centers of adjacent commutator bars at the commutator surface.

$S_c$ is the distance between the nearest sides of adjacent commutator bars at the commutator surface.

$T_b$ is the brush element thickness along the line of relative commutator movement and is equal to $D_b - S_b$ at the commutator surface.

Figure 2:
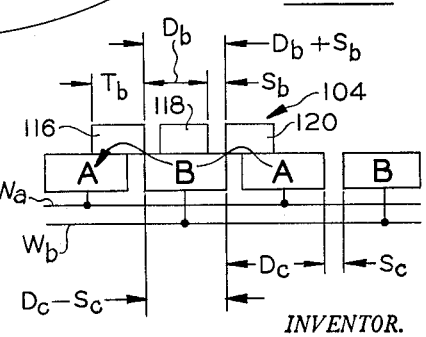

Figure 2 illustrates a brush arrangement for an armature having two separate closed windings, $W_a$ and $W_b$. A segmented brush 104 has three brush elements 116, 118, and 120 contacting the commutator bars. It is evident from Figure 2 that the minimum distance $(D_b + S_b)$ between alternate brush elements which will prevent direct short circuiting of an armature coil through the brush elements must be equal to or greater than the width of a commutator bar $(D_c - S_c)$. The relation between the brush elements and commutator bars for this condition is:

(1) $$D_b + S_b \geq D_c - S_c$$

Figure 3:
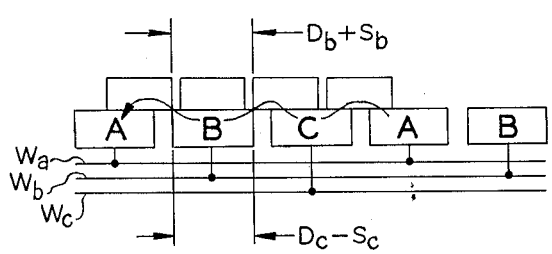
Figures 2 to 7 are diagrammatic developed views of armature sections illustrating brush element and commutation bar relations and showing possible closed circuits due to direct short circuits formed by overlapping contact of brush elements and commutation bars.
Figure 4:
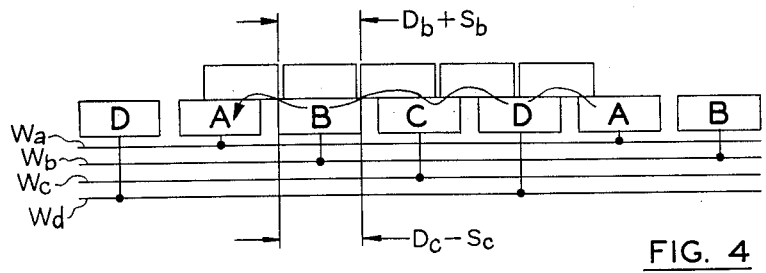

This relation will hold true regardless of the value of $m$, as shown in Figures 3 and 4, where $m$ is 3 and 4, respectively.

Figure 5:
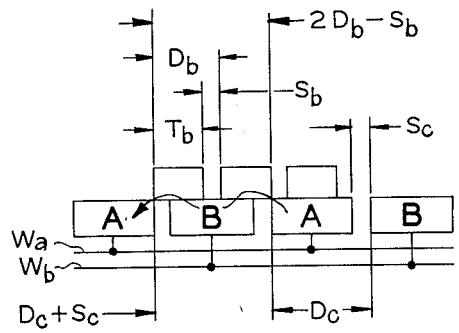

Figure 5 is the same as Figure 2 except that the relative positions of the brush and commutator are changed, and it is evident from the figure that the maximum distance $(2D_b - S_b)$ which two brush elements can span on the commutator without causing a direct short circuit through the brush elements of two bars connected to the same winding must be equal to or less than the width of a commutator bar plus a slot width on both sides of the bar ($D_c+S_c$). The relation between the brush elements and commutator bars for this condition is:

(2) $\quad 2D_b - S_b \leqq D_c + S_c$

Figure 6:
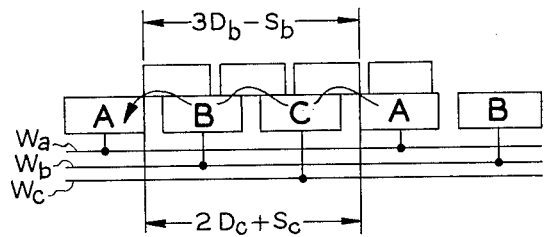

From Figure 6, which shows three independent armature windings and a segmented brush having four separate brush elements contacting the commutator bars, it is evident that the required relation to prevent a direct short circuit is:

(3) $\quad 3D_b - S_b \leqq 2D_c + S_c$

Figure 7:
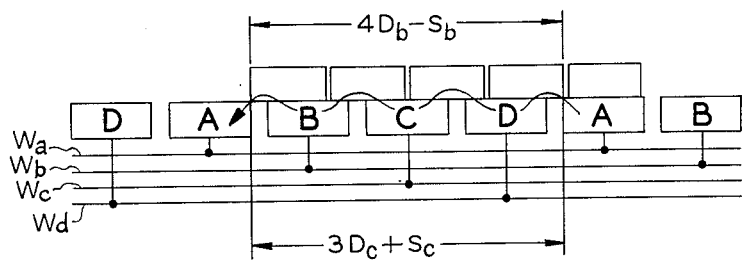

An inspection of Figure 7 indicates that the required relation to prevent direct short circuits when the brush has five brush elements and the armature has four independent windings is:

(4) $\quad 4D_b - S_b \leqq 3D_c + S_c$

It will be observed that the Relations 2, 3, and 4 are a function of $m$ and can be resolved in the common relation (5) $\quad mD_b - S_b \leqq (m-1)D_c + S_c$ Direct short circuits of armature coils formed by only one brush and productive of damaging internal circulating current will be avoided, if the commutator bars and the brush elements of a brush are related in accordance with the Relations 1 and 5.

The inequalities of Relations 1 and 5 can be removed by adding positive constants $K_n$ and $K_o$, respectively, to the smaller side of the relations with the understanding that such constants may also have a value of zero.

(6) $\quad D_b + S_b = D_c - S_c + K_n$ (7) $\quad K_o + mD_b - S_b = (m-1)D_c + S_c$ These equations can now be solved simultaneously for $D_b$ and $S_b$, and from these $T_b$ may be obtained since $T_b = D_b - S_b$. It can be shown that when solving for $S_b$ from the Equations 6 and 7, its minimum value and therefore the maximum value of $T_b$ will occur when the constants $K_n$ and $K_o$ are zero. In such case, (8) $\quad D_b = \dfrac{m}{m+1} D_c$ (9) $\quad S_b = \dfrac{D_c}{m+1} - S_c$

(10) $\quad T_b \leqq \left(\dfrac{m-1}{m+1}\right) D_c + S_c$

It will be seen that $D_b$ may remain fixed while $S_b$ and $T_b$ may vary within the value of $D_b$.

In order that all $(m)$ windings will be in contact with brushes all the time, there must be a sufficient number of brush elements in each set to span $m$ commutator bars. Therefore, the minimum number of brush elements necessary to work all the windings all the time is:

(11) $\quad \dfrac{mD_c}{D_b} = \dfrac{mD_c}{\dfrac{m}{m+1}D_c} = m+1$

More brush elements per set may be used. However, to maintain balanced current distribution through the brushes and the windings, the number of brush elements per set should be $(m+1)$ or a multiple thereof. In a lap winding, there must be one set per pole. In the case of a wave winding, the total number of brush elements of one polarity constitute a set and must equal $(m+1)$ or a multiple thereof, and if they are not all in one location or pole position, they must be distributed around the commutator so as to have the same positional relation to bars of each winding that they would have if they were all at one location.

Figure 8 illustrates a duplex doubly re-entrant winding and a brush having $2(m+1)$ brush elements. This figure indicates that with each addition of a basic group $(m+1)$ of brush elements, a closed circuit is formed between portions of the two windings. It will be observed that this circuit will be closed under the same relative brush element of each basic group and that an equal number of coils in each winding is spanned between these junctions. However, since substantially equal transformer voltages are induced in all coils undergoing commutation, the resulting voltage due to transformer voltages in the coils of the closed circuit will be substantially zero and no appreciable circulating current will flow because of these junctions. It will also be noted that when the Relations 1 and 5 are observed, a closed circuit involving an unequal number of coils of the two windings will not be made by the brush elements of one brush contacting the commutator bars, thus eliminating the internal circulating current which would otherwise flow if such a closed circuit were formed.

The correct location of the brush elements can also be assured by placing them so that they are each entirely within a "safe zone" defined as follows. The maximum $T_b$ as defined by $$T_b = \left(\dfrac{m-1}{m+1}\right) D_c + S_c$$

is the extent $T_z$ of a safe zone, and the centers of adjacent safe zones are $D_z$ apart which is equal to and determined in the same manner as $D_b$. The safe zones are located within a commutation region and on the line defined by the commutator surface, and as long as the transformer voltage induced in all coils undergoing commutation is substantially equal, the safe zones extend consecutively from end to end of the commutation region. Thus, a brush element may be placed in any safe zone and in any part of the safe zone as long as $T_b \leqq T_z$, $T_b \geqq S_c$, and the sides of the brush element do not extend out of the safe zone. It will be appreciated that in order to work all the windings all the time, the rules governing the basic groups of $(m+1)$ brush elements should also be observed.

Proportioning and placement of brush elements in safe zones as outlined or in accordance with Relations 1 and 5 will avoid injurious shorts involving only one segmented brush, i. e., simple like-polarity shorts. The prevention of complex like-polarity shorts, i. e., those involving two brushes of the same polarity but located in different commutation regions $2\pi$ electrical radians or a multiple thereof apart, will be treated in the following section.

*Short circuits caused by the coaction of two different brushes of like polarity*

Transformer voltages exist in all the independent armature windings and if two such windings are joined together in more than one place along the commutator by brush elements, a differential transformer-induced potential will exist between the windings which could be a value from zero upwards depending on where the separate windings are joined together. It will be readily apparent that junctions between two windings can be formed by one brush element if the bars of the respective windings are immediately adjacent to each other. However, where the number of independent windings is greater than two, there are instances where the consecutive bars of two windings are not immediately adjacent to each other because of intervening bars of other windings. In such a case, a pair of consecutive bars of two such windings can be directly joined only by a plurality of brush elements overlapping the consecutive bars and the intervening bars. The case where one brush element joins consecutive bars of two windings will be referred to as a two bar junction. Other cases necessitating the overlapping contact of a plurality of brush elements on the consecutive bars of two windings and intervening bars will be referred to as three bar junctions, four bar junctions, etc. depending on the number of bars including the consecutive bars and the intervening bars.

When a bar of one winding is joined with a bar of a second winding through a brush element or elements at one point of the commutator, there will be a closed circuit between the windings if respective bars of the same windings are joined together by a brush element or elements anywhere else along the commutator. Whether or not an internal circulating current will be produced by such a closed circuit will depend on the transformer voltages of each winding between the junctions. If the transformer voltage in each winding between those junctions is zero or if it is of equal value and the same polarity in each winding, the differential transformer voltage of the two windings when connected together at these points will be zero and no internal circulating current will flow. However, if the summation of transformer voltages of the coils of one winding is different from the sum of those of the other winding between the two points, a resultant transformer voltage equal to the difference of the transformer voltages of the respective windings will cause internal circulating current to flow.

In each of Figures 9 and 10, a portion of an armature having four independent windings is shown ($m=4$), Figure 9 being lap wound and Figure 10 being wave wound. The windings are omitted for clarity and only a commutator 156 and two brushes 158 and 160 of like polarity are shown. The brushes are approximately $2\pi$ electrical radians apart. Each independent winding is connected to bars sequentially spaced along the commutator 156, the sequence being every $m$th bar. One winding is connected to the A bars, a second winding is connected to the B bars, etc. Adjacent bars are separated by spacers or slots as indicated by the lines 162. Brush 158 has five separate brush elements 164, 166, 168, 170, and 172, and brush 160, likewise, hase five brush elements, 174, 176, 178, 180, and 182. Thus each of the brushes 158 and brush 160, likewise, has five brush elements, 174, elements for an armature having four independent windings. The elements of both brushes conform to the Relations 1 and 5.

The following method has been adopted for referential location of commutator bars. A pair of consecutive bars of any two windings may be either one of two orders. For example, with reference to A and B bars, the order may be A and B or B and A. A pair of consecutive A and B bars constituting an A bar and the first B bar clockwise thereof is referred to as a pair of consecutive AB bars in that order. An A bar and the first B bar counterclockwise thereof shall be referred to as a pair of consecutive BA bars in that order. If the rotation of the commutator is counterclockwise, the A bar leads the B bar and the B bar trails the A bar in the case of adjacent AB bars in that order. In the reverse order, the A bar trails the B bar. The same is true for bars of any other two windings. For example, a B bar and the first D bar clockwise thereof shall be referred to as a pair of consecutive BD bars in that order. A B bar with the first D bar counterclockwise thereof will be considered as a pair of consecutive DB bars in that order. A pair of consecutive bars joined by a brush element or elements may be referred to as a junction of the two windings, and the reference to order shall be extended to such junctions. For example, consecutive A and C bars joined by brush elements may be considered an AC junction. When considering an AC junction and a CA junction, they may be referred to as junctions of unlike order.

There will always be an equal number of coils in any two windings between two like order pairs of consecutive bars, respectively connected to the two windings. Between two unlike order pairs of consecutive bars, the number of coils in the windings will be unequal. In the latter case, there will be one less coil in one winding in a lap wound armature, and $$\frac{P}{2}$$

coils less in one winding in a wave wound machine, where P is the number of poles.

Regardless of the number of separate windings on an armature, the following transformer voltage relations exist between a pair of consecutive bars of any two windings at one brush position when a pair of consecutive bars of the same windings are joined by a brush element or elements in another brush position of like polarity, i. e., approximately $2\pi$ electrical radians or a multiple thereof away.

When a brush element or elements join a pair of consecutive bars of two windings in a particular order, the like order pair of consecutive bars of the same windings nearest to $2\pi$ electrical radians away from the first pair of bars will have between them little if any differential transformer-induced voltage, and if a brush element or elements were to join the second pair of like order consecutive bars, the resulting internal circulating current would be zero or a negligible quantity. In the case of a lap winding, the closer to $2\pi$ electrical radians away that the second like order pair of consecutive bars (referred to in the preceding sentence) is from the junction of the first like order pair of bars, the lower will the resultant transformer-induced voltage be between them. At exactly that distance in electrical radians, the second set of consecutive bars will have zero transformer-induced voltage between the bars.

It is impossible that two pairs of like order consecutive bars be exactly $2\pi$ electrical radians apart in a wave winding because of its inherent design, which to have any symmetry must satisfy the wave winding relation, $$C=\left(\frac{NP}{2}+1\right)$$

The closest they can get to that distance apart is $$2\pi+\frac{2\pi}{C}$$

electrical radians. However, at $$2\pi\pm\frac{2\pi}{C}$$

radians distance of separation, the brush elements are in communication regions of the same polarity, and only one coil per winding is connected between like order pairs of consecutive bars separated thusly. Consequently, in a wave winding if the transformer voltage induced in each coil throughout the commutation regions is substantially equal, the transformer voltage between two pairs of like order consecutive bars located in separate commutation regions of like polarity will be substantially zero and if each of these pairs of bars are joined by a brush element or elements, no substantial internal circulating current will flow as a result thereof.

On the other hand, in either lap or wave windings, there will be a relatively high resultant transformer voltage between consecutive bars of one order, when a second pair of consecutive bars of the same windings, but in reverse order, and located approximately $2\pi$ electrical radians away from the first pair of bars, are shorted by a brush element or elements. Thus, if unlike order pairs of consecutive bars of any two windings and located approximately $2\pi$ electrical radians apart are each joined at the same time, injurious internal circulating current will flow as a result thereof.

From the above findings, stem the following additional requirements which must be observed, together with the previous required Relations 1 and 5, in order to eliminate injurious circulating current between brush elements of like polarity located at two different brush positions (commutation regions) approximately $2\pi$ electrical radians or a multiple thereof apart. The relations of brushes of like polarity and the commutator bars should be such that unlike order junctions between any two windings, cannot be formed at the same time by brushes approximately $2\pi$ or a multiple thereof apart, i. e., in different commutation regions of like polarity. Stated in another way, any two windings should not be joined at the same time by two brushes of like polarity approximately $2\pi$ electrical radians or a multiple thereof apart if there are an unequal number of coils in both windings between the junctions.

The above additional requirements will be satisfied if the brush elements in one commutation region are related to the commutator bars of the respective windings in the same manner as are the brush elements in another commutation region of like polarity, i. e., if each brush element of one polarity bears a positional relation to the commutator bars that is assumed by or related by Relations 1 and 5 to a second brush element of the same polarity but in another commutation region.

This is illustrated in Figures 9 and 10. In both figures, the bars of the respective windings under the brush on the left side are contacted in the same way as under the brush on the right hand side. For example, in Figure 9, a C bar on the left side is contacted by brush elements 166 and 168 in the same manner that a C bar on the right hand side is contacted by the brush elements 176 and 178. Assume for the moment that the brushes 158 and 160 in Figure 9 have each only two brush elements 166, 168, and 180, 182 respectively. The position of element 166 with respect to the commutator bars, is the same as a second position in another commutation region of like polarity, which second position, whether occupied by a brush element or not, is related [in accordance with Relations 1 and 5] to a second brush element (180) in the other commutation region of the same polarity (right side, Figure 9). In Figure 10, a D bar on the left side is contacted by brush elements 168 and 170 in the same way that a D bar under the right hand brush is contacted by brush elements 176 and 178.

In the particular relative position of the commutator shown in Figure 9, three windings have been joined by like order junctions. For example, like order AB junctions are made by brush elements 164 and 174, like order BC junctions are made by brush elements 166 and 176, and like order AC junctions are formed by brush elements 164 and 166 under one brush and 174 and 176 under the other brush. The distances between like order junctions indicated at 184, 186, and 188 are the same as the distance between centers of the brushes 158 and 160 indicated at 190. If this distance is exactly $2\pi$ electrical radians, the resultant transformer voltage will be zero between the AB junctions, between the BC junctions, and between the AC junctions, and there will be no internal circulating currents as a result thereof, since they are like order junctions. If the distances indicated at 184, 186, 188, and 190 are not exactly $2\pi$ electrical radians, the respective resultant transformer voltages between the junctions will be so small as to produce negligible or non-injurious internal circulating currents, because the brushes 158 and 160 are located in commutation regions of like polarity which makes them at least approximately $2\pi$ electrical radians apart.

In Figure 10, BC junctions are formed by brush elements 166 and 174, CD junctions are formed by brush elements 168 and 176, and BD junctions are formed by brush elements 166 and 168 of brush 158 and by brush elements 174 and 176 of brush 160. The distance between these like order junctions is $$2\pi - \frac{2\pi}{C}$$

(indicating a retrogressive winding) and the distance between the brush centers indicated at 192 is approximately $2\pi$ electrical radians. Since the brushes 158 and 160 are located in commutator regions of like polarity, the like order junctions shown in Figure 10 will produce substantially no internal circulating current.

An inspection of Figures 9 and 10 will show that in any position of the commutator, the brushes 158 and 160 cannot form junctions of unlike order at the same time.

As far as the lap winding is concerned, one way of meeting the above requirement is to construct the armature so that $$\frac{2C}{P}$$

is equal to a whole number. Brush sets of one polarity can then be symmetrically spaced exactly $2\pi$ electrical radians apart, and so spaced will meet the requirements. This is illustrated in Figure 9 if the brushes 158 and 160 are considered to be exactly $2\pi$ electrical radians apart.

Another way of obtaining these requirements is to place a reference brush element in a commutation region and assume a commutator position where the brush element will contact any convenient reference point on the commutator. For example, let it span symmetrically, a pair of adjacent bars in a particular order. Then in another commutation region of like polarity place a second reference brush element so that it symmetrically spans a like order junction. Next, if necessary, move one or both brush elements in increments of $D_b$ until they are as closely aligned with the centers of their respective commutation regions as is possible. Other brush elements can then be added using the proper relation of $D_b$ on one or both sides of the reference brush elements to fill out the complements of $m+1$ called for in any particular design.

As hereinbefore mentioned in wave windings, the total number of brush elements of one polarity must be $m+1$ or a multiple thereof, and it is not necessary to have $m+1$ brush elements at every brush position. The total brush elements of one polarity may be only $m+1$ in the case of a wave winding even though they are not all at one brush position.

An example of one basic brush group $(m+1)$, distributed around the commutator, is a duplex four pole wave wound machine (Figure 11). There are four commutation regions, two of one polarity and two of the opposite polarity. One brush element may be placed in one commutation region and the other two (to make a total of $m+1$) properly located in the region $2\pi$ electrical radians away (the same polarity), the other two positions of opposite polarity being treated likewise. Also, the division of the set may be four and two, etc. Other examples of distribution of brush elements in wave wound machines are shown in Figures 12 and 13 which show the same six pole armature of Figure 1, but with one and two brush elements, respectively, in each commutating region, such elements being located in the manner previously described. Figures 1, 12, and 13 are examples showing the same wave wound armature with $3(m+1)$, $(m+1)$ and $2(m+1)$ brush elements, respectively, per set.

In case of lap windings as hereinbefore stated, a brush set is required for each pole and each brush set must have at least $(m+1)$ brush elements. If additional brush elements are desired, they should be added in complements of $(m+1)$ to maintain equal currents in all the windings. Of course, the values of $D_b$ and $T_b$ should be determined before locating the reference brushes in the various commutation regions.

Safe zones can be located by considering the line of contact of the first and second reference brushes as safe zones in the respective different commutation regions of like polarity. The width of the safe zone will, as before, be $T_z$ and will again be equal to the maximum $T_b$ obtainable from the Relations 1 and 5. Each of the commutation regions can then be divided into safe zones by locating such zones with respect to the reference safe zones using $D_z = D_b$ as separation of adjacent zone centers. Brush elements placed in any or all the safe zones in different commutation regions of like polarity will not concurrently form dangerous unlike order junctions between consecutive bars of any two windings.

The distance between centers of any two safe zones of like polarity whether in one commutation region or in different commutation regions of like polarity will be an integral number of units of $D_z$ apart. Likewise, if the maximum $T_b$ is used, then the distance between centers of any two brush elements of like polarity will be an integral number of units of $D_b$ apart.

Internal circulating currents caused by like-polarity shorts, simple and complex, have been treated thus far. Unlike-polarity shorts which cause internal circulating currents between brush elements of unlike polarity will be considered next.

*Elimination of unlike-polarity shorts*

Figures 14, 15, and 16 show the various resultant transformer voltages between like order and unlike orders of bars at a commutation region of one polarity when a junction is formed at a commutation region of unlike polarity, i. e., approximately $\pi$ electrical radians away. Each of the figures is dual in purpose in that voltages for lap and wave wound machines are indicated. "$V_L$" and "$V_W$" are symbols for approximate resultant (differential) transformer voltages for lap and wave windings, respectively. For example, in Figure 14 where a commutator for two independent windings ($m=2$) is shown, an AB junction between A and B bars 195 and 196 has been formed by a brush element 197 of a brush 198 in a commutation region of one polarity. During the continuance of the AB junction, the resultant transformer voltage between a like order pair of consecutive bars 200 and 202 in a commutation region of unlike polarity will be $V_L = V$ in a lap winding or $$V_W = \frac{VP}{2}$$

in a wave winding. The term $$\frac{P}{2}$$

represents the number of coils in series between successive bars of any one winding in a wave wound machine. $V$ is the transformer induced voltage in a coil in the commutation region, and the transformer voltage is assumed to be equal in all coils undergoing commutation. The resultant transformer voltage between an unlike pair of consecutive bars (BA bars 204 and 200 or 202 and 206) in the region of unlike polarity will be $V_L=0$ for lap or $V_W=0$ for wave. Thus, where $m=2$, if like order junctions are formed at the same time in commutation regions of unlike polarity, injurious internal circulating current will flow as a result thereof. However, unlike order junctions may be formed at the same time in commutation regions of unlike polarity without causing injurious internal circulating current to flow.

In Figure 15, $m=3$ and brush elements 208 and 210 of a brush 212 form a three bar AC junction in a commutation region of one polarity. The intervening B bar is also joined to the A and C bars to form an AB junction and a BC junction. The resultant transformer voltage between the bars of respective like order pairs of consecutive bars AB and BC in the commutation region of opposite polarity is $$V_L = \frac{2V}{3}$$

for a lap winding and $$V_W = \frac{VP}{3}$$

for the wave winding. The voltage between the like order pair of consecutive AC bars is $$V_L = \frac{4V}{3}$$

or $$V_W = \frac{2VP}{3}$$

The resultant transformer voltage between the bars of the unlike order pairs of consecutive bars (CB or BA) in the second commutation region is $$V_L = \frac{V}{3}$$

for the lap wound and $$V_W = \frac{VP}{6}$$

for the wave wound, and between the unlike order CA bars, $$V_L = -\frac{V}{3}$$

and $$V_W = -\frac{VP}{6}$$

Thus, where $m=3$, when either like order or unlike order junctions are made at the same time in commutation regions of unlike polarity, the resultant transformer voltage in the closed circuits formed thereby is great enough to cause injurious circulating current. The latter statement has been found to be general in all cases where $m$ is an odd number, 3, 5, 7, etc.

It will be noted that in Figure 14 where $m$ is 2, the respective independent armature windings are adjacent to each other and equidistant from each other in the armature slots, while in Figure 10, where $m$ is 3, no two windings are equidistant from each other in the armature slots.

Also, where $m=2$, the consecutive bars of the two windings are equidistant from each other, and where $m=3$, the consecutive bars of any two windings are never equidistant from each other. Whenever $m$ is an odd number, there are no two windings whose consecutive bars are equidistant from each other.

In Figure 16, $m=4$ and a three bar junction involving DAB bars is formed by brush elements 214 and 216 of a brush 220. This is made up of three junctions, a DA junction, an AB junction, and a DB junction. The resultant transformer voltages between the bars of the respective like order pairs of consecutive bars (DA, AB, and DB bars) in a commutation region of opposite polarity are each great enough to produce internal circulating current. The highest voltage is between the like order consecutive bars that are equidistant from each other, for example, the DB bars where $V_L = V$ for a lap winding and $$V_W = \frac{VP}{2}$$

for a wave winding. These voltages are equivalent to a full coil voltage and full $$\frac{P}{2}$$

coil voltage, respectively, and consequently, the reverse order of consecutive bars (BD bars) will have substantially zero voltage between them as indicated in Figure 16. The other reverse order consecutive bars (AD and BA bars) of the respective junctions (DA and AB junctions) all have, as indicated, sufficient transformer voltage to cause injurious internal circulating current to flow if a junction between the AD bars or the BA bars is formed by brush element or elements in the commutation region of opposite polarity.

In general, it can be stated for either lap or wave windings, and regardless of the value of $m$, that like order junctions made at the same time in commutation regions $\pi$ electrical radians or an odd multiple thereof apart, i. e., commutation regions of unlike polarity, will produce injurious internal circulating current. Also, unlike order junctions, involving any two windings whose consecutive bars are not equidistant apart, made at the same time in commutation regions of unlike polarity will produce injurious internal circulating currents. Thus, in order to avoid injurious internal circulating currents in either lap or wave wound armatures having a plurality of independent closed windings, brushes of unlike polarity should be so proportioned and spaced from each other that:

(1) Like order junctions between any two windings should not be made at the same time by brushes of unlike polarity, i. e., brushes located in commutation regions $\pi$ electrical radians or an odd multiple thereof apart.

(2) Unlike order junctions between any two windings not equidistant from each other, i. e., whose consecutive bars are not equidistant from each other, should not be made at the same time by brushes of unlike polarity, i. e., brushes located in commutation regions $\pi$ electrical radians or an odd multiple thereof apart.

The above conditions may be restated as follows: Brushes of unlike polarity must be so proportioned and spaced from each other that:

(1) They do not simultaneously join any two windings with an equal number of coils in each winding between the junctions.

(2) They do not simultaneously join an unequal number of coils in any two windings that are not equidistant apart in the armature slots, i. e., whose consecutive bars are not equidistant apart.

In order to eliminate the possibility of any two windings being simultaneously joined together by brush elements of unlike polarity in such manner as to produce injurious internal circulating current, not only must there be a specially related spacing between brush elements of unlike polarity but also in all cases, except where $m=2$, $T_b$ will be less than the maximum obtainable from Relations 1 and 5.

Figure 17 is an example illustrating the special spacing between brushes of unlike polarity and the evolution of the maximum brush thickness which will avoid the formation at the same time, by unlike polarity brushes, of like and unlike order junctions which would cause injurious internal circulating current to flow, except where an unlike order junction involves $$\frac{m+3}{2}$$

bars in an armature having an odd number of windings, i. e., where $m$ is odd. The latter case will be treated subsequently. The figure is applicable to either lap or wave wound armatures and to any value of $m$. Only portions of a commutator 222 are shown and two like order pairs of consecutive bars, for example, AB bars, are indicated as being $$m\left(\frac{C}{P}\right)_i$$

commutator bars apat where C is the number of coils per winding, P is the number of poles, and the quantity $$\left(\frac{C}{P}\right)_i$$

is the integer part of the ratio $$\frac{C}{P}$$

Windings $W_a$ and $W_b$ (not shown) are connected to the A bars and to the B bars, respectively. The center lines of two unlike poles are indicated at 224 and 226, and two brushes of unlike polarity are shown at 228 and 230. The number of brush elements per brush may be any number depending on the particular type of windings, the number of windings, and in the case of wave windings, the number of poles. In the example of Figures 17, $m=3$ and $m+1$ or four brush elements are shown for each brush. The brush centers are approximately $\pi$ electrical radians apart. Under certain conditions, they will be exactly $\pi$ radians apart.

Assuming that the commutator 222 is rotating in the direction of the arrow 232, a brush element 234 is in contact with a B bar and just breaking contact with an A bar, while a brush element 236 of opposite polarity is in contact with an A bar and just making contact with a B bar. Thus, an AB junction is just being broken under brush element 234 while an AB junction is just being made under brush element 236. It will be apparent from the figure that the first AB junction which can be made under brush 228 as the commutator moves counterclockwise from the position in the figure is by a brush element 238. However, before this can happen, the commutator must move a distance greater than $(D_b-T_b+S_c)$, and while the commutator moves through this distance, an AB junction may be formed by the brush elements of the brush 230 without danger of an AB junction being formed by brush 228. From the time that the AB junction is first formed by the brush element 236 until that junction is broken, the commutator moves through a distance equal to $(T_b-S_c)$. Therefore, the latter distance must be less than the distance $(D_b-T_b+S_c)$ in order to prevent the formation of like order junctions simultaneously by brush elements in both brushes 228 and 230 and the maximum brush thickness $T_b$ which can be tolerated is governed by the relation:

(12) $$D_b-T_b+S_c \geqq T_b-S_c$$

or

(13) $$T_b \leqq \frac{D_b}{2}+S_c$$

For all the values of $m$ except 2, Relation 13 will give a thinner brush and a smaller safe zone $$\left[(13a) \quad T_z=\text{maximum } T_b=\frac{D_z}{2}+S_c\right]$$

than the maximum obtainable from Relations 1 and 5.

It will be seen from Figure 17 that the distance between centers of the brush elements 234 and 236 is:

(14) $$m\left(\frac{C}{P}\right)_i D_c-(T_b-S_c)$$

or $$m\left(\frac{C}{P}\right)_i D_c-\frac{D_b}{2}$$

This spacing which is that required for the maximum $T_b$ is also the spacing between centers of two safe zones whose centers coincide with those of brush elements 234 and 236. The spacing (14) of the brush elements may be increased or decreased by the amount of $$\frac{D_b-S_c}{2}$$

if the brush thickness is reduced in accordance with the degree of change. Thus, the distance between brush elements 234 and 236 may be from:

(15) $$m\left(\frac{C}{P}\right)_i D_c-D_b+\frac{S_c}{2}$$

to

(16) $$m\left(\frac{C}{P}\right)_i D_c-\frac{S_c}{2}$$

The brush elements in each brush satisfy the Relations 1 and 5 and are $D_b$ apart in each brush. Thus, the distance (center to center) between any two brush elements of unlike-polarity may vary from:

(17) $$m\left(\frac{C}{P}\right)_i D_c-D_b+\frac{S_c}{2} \pm XD_b$$

to

(18) $$m\left(\frac{C}{P}\right)_i D_c-\frac{S_c}{2} \pm XD_b$$

where X is either 0 or any integer. The distance between centers of any two safe zones of opposite polarity is:

(19) $$D_{uz}=m\left(\frac{C}{P}\right)_i D_c - \frac{D_z}{2} \pm XD_z$$

where $D_z$ is the distance between centers of adjacent safe zones of like polarity.

When brush elements of unlike-polarity are so proportioned and located that they cannot simultaneously join any two windings together to form a closed circuit that includes an equal number of coils in each winding, the brush elements of like-polarity will automatically be correctly spaced to prevent an unequal number of coils in any two windings from being shorted together by simultaneous junctions formed by brush elements of like-polarity but located in different commutation regions.

Since $$D_b = \frac{m}{m+1}D_c, \quad D_c = \frac{m+1}{m}D_b$$

and substituting this value for $D_c$ in the Quantity 14, the following quantity

(20) $$\left[(m+1)\left(\frac{C}{P}\right)_i - \tfrac{1}{2}\right]D_b$$

is obtained. The quantity $$\left(\frac{C}{P}\right)_i (m+1)$$

is always an integer. Therefore, the required distance between any two brush elements of maximum $T_b$ and of unlike-polarity is a whole number minus a half brush spacing ($D_b$). A whole number minus a half may be expressed mathematically as $$\frac{2Q+1}{2}$$

where $Q$ is any integer. The distance between any two brush elements of unlike-polarity may then be expressed as:

(21) $$\left(\frac{2Q+1}{2}\right)D_b$$

or $$\frac{2Q+1}{2}\frac{m}{m+1}D_c$$

This may be varied by $$\pm\frac{D_b - S_c}{2}$$

with a corresponding reduction in brush thickness to match the variation. Thus, the spacing between centers of any two brush elements of opposite polarity is a non-integral number of units of $D_b$ and may range from:

(22) $$\left(\frac{2Q+1}{2}\right)D_b - \frac{D_b - S_c}{2}$$

to

(23) $$\left(\frac{2Q+1}{2}\right)D_b + \frac{D_b - S_c}{2}$$

Likewise, the spacing (center to center) between any two safe zones of unlike polarity is $$\left(\frac{2Q+1}{2}\right)D_z$$

where $D_z$ is the distance between centers of adjacent safe zones and is equal to $$\frac{m}{m+1}D_c$$

These requirements for spacing between brushes of unlike polarity illustrated in Figure 17 may be described in the following manner:

Place a reference brush element in a commutation region of one polarity and rotate the armature to a position where the brush element is just breaking a two-bar junction of a pair of bars in a particular order. Then in a commutation region of opposite polarity, place a second brush element so that it is just making a like order junction of the same windings. Next, move either one or both brush elements within their respective commutation regions in increments of $D_b$ until they are aligned as near as possible with the centers of their respective commutation regions. Then, if the design calls for more than one brush element per brush, place the requisite additional brush elements on either or both sides of the reference brush elements and $D_b$ apart in such manner as to attain the most symmetrical alignment between the brush and commutation region centers.

Each of the comutation regions may be divided into a plurality of safe zones, $T_z$ wide and $D_z$ apart by considering the centers of the above reference brush elements as the centers of reference safe zones. $T_z$ has the same value as the maximum permissible $T_b$ as above defined, and $D_z$ is equal to the value of $D_b$ obtained from Relations 1 and 5 when the maximum $T_b$ is considered.

Location of brush elements in the above described safe zones or the spacing of brushes of unlike polarity and the proportions of the brush elements exemplified in Figure 17 and the attendant description, will prevent brushes of unlike polarity from joining at the same time:

(1) Like orders of consecutive bars of any two windings regardless of the value of $m$;

(2) Unlike orders of consecutive bars of any two windings where $m$ is even and which would produce injurious internal circulating currents if joined at the same time;

(3) Unlike orders of consecutive bars of any two windings where $m$ is odd, except where, in one order, the consecutive bars of the two windings plus the intervening bars equal $$\frac{m+3}{2}$$

With the spacing of Figure 17 and with $$D_b = \frac{m}{m+1}D_c$$

and $$T_b = \tfrac{1}{2}\left(\frac{m}{m+1}\right)D_c$$

it can be shown that where $m$ is odd $$\frac{m+3}{2}$$

bars are contacted by $$\frac{m+1}{2}$$

brush elements when the commutator is in such position that the number of adjacent bars spanned by a group of brush elements is a maximum.

Examples of this are shown in Figures 18 and 19 which illustrate the possible unlike order shorts which may occcr where $m$ is odd and where the spacing and the maximum brush thickness of Figure 17 are observed. In Figure 18, $m=3$, i. e., there are three independent closed armature windings (not shown), each winding being connected to every third bar. In these figures, $S_c$ is reduced to a thin line, thus presenting the most difficult case. The only closed circuit between two windings is diagrammatically shown by the wavy lines and the lines 242 and 244 representing the windings which can be either lap or wave. Two brush elements of the left-hand brush form a three-bar junction between C and B bars, and a brush element of the right-hand brush of unlike polarity forms an unlike order two-bar junction between BC bars. These junctions, formed at the same time by brushes of unlike polarity, are productive of injurious internal circulating current as indicated in Figure 15.

In Figure 19, $m=5$, and the closed circuit formed between two windings (lap or wave) between brushes of unlike polarity is indicated in the same manner as that in Figure 18. It will be noticed that three brush elements of the left-hand brush of Figure 19 form a four-bar junction and two brush elements of the right-hand brush of unlike polarity form a reverse order three-bar junction. Since the unlike order junctions, shown in Figure 19, involve windings not equidistant from each other in the armature slots, i. e., whose consecutive bars are not equidistant from each other, injurious internal circulating current will flow as a result of these junctions being formed at the same time.

In order to avoid the injurious junctions illustrated in Figures 18 and 19, the brush elements must satisfy not only Relation 12 but also relation

(24) $\left(\dfrac{m-1}{2}\right)D_b + T_b \leqq \left(\dfrac{m-1}{2}\right)D_c + S_c$ or (24a) $T_b \leqq \dfrac{m-1}{2}(D_c - D_b) + S_c$ the evolution of which is illustrated in Figure 20. In this figure, $m=7$, and each of the seven independent closed windings (not shown) is connected to every seventh bar of the commutator. Portions of two windings $W_g$ and $W_d$ are shown connected between G bars and D bars, respectively, under commutation regions of unlike polarity. Each of two brushes 246 and 248 of unlike polarity is made up of $m+1$ or eight brush elements. It will be apparent from the figure that if a GD junction is formed by the brush 246, there will be a closed circuit between the windings $W_g$ and $W_d$ which will cause an injurious circulating current to flow between brushes 246 and 248. It will be apparent also that to avoid a five-bar junction between G and D bars $$\left(\dfrac{m+3}{2} \text{ bars}\right)$$

being formed by four brush elements 250, 252, 254, and 255 of the brush 246

$$\left(\dfrac{m+1}{2} \text{ brush elements}\right)$$

the Relation 24 must be satisfied.

Thus where $m$ is odd, the extent of each safe zone $T_z$ and the maximum brush thickness will be determined by the Relation [12 or 24] which will result in the thinnest or lowest maximum value for $T_b$ of any of the relations described.

For many reasons, an electrodynamic machine wherein all the brushes are symmetrically spaced is the most desirable. A better balance of the power or operating current distribution is obtained with symmetrically spaced brushes. It is possible to construct a commutation system which will satisfy all the rules of brush element proportion and spacing between brushes of like and unlike polarity and which will also have symmetrically spaced brushes. However, it is also true that only certain combinations in which exist a special relation between the number of armature coils, the number of independent armature windings, and in some cases, the number of poles, in the machine, can have such symmetrically spaced brushes as will satisfy the spacing relations hereinbefore set forth. These special relations between number of coils, number of windings, and number of poles will be obtained if the following relation is satisfied:

(25) $\dfrac{\dfrac{P}{2}(2Q+1)m}{m+1} = B_t$ where $B_t$ is the total number of commutator bars, and Q must be an integer. If this quantity is a whole number, and it must be (practical commercial commutators are not built with a fraction of a bar), then the brushes in following the spacing relations hereinbefore set forth will be symmetrically spaced, i. e., they may be distributed exactly $\pi$ electrical radians apart around the commutator and in that position will automatically fall within the rules and relations developed herein.

Tables can be set up to indicate what values of $B_t$ in relation to number of poles and number of armature windings wil satisfy the Relation 25 and thereby provide an armature where symmetrically spaced brushes will fall within the brush spacing rules disclosed herein. For example, the following tables were made up for armatures where $m=2$ and $m=3$, respectively. It will be readily apparent that these tables are merely illustrative and can be extended indefinitely. The quantity at the top of each column is the ratio $$\dfrac{\dfrac{P}{2}(2Q+1)m}{m+1}$$

simplified for the number of poles and windings considered. Wherever the total number of bars (total number of bars also equals total number of coils) is an integer in the tables, a lap wound machine with the number of poles indicated in the top of the column and the number of windings for which the table is developed, will have symmetrically spaced brushes that will also be related in accordance with the spacing rules hereinbefore developed. It must be remembered that wave wound armatures must also satisfy the wave formula, i. e., $$\dfrac{P}{2}(n) \pm 1$$

equals coils per winding (also the number of bars). The total number of coils or bars will be equal to $$m\left(\dfrac{P}{2}n \pm 1\right)$$

Those quantities marked with an asterisk in the tables also satisfy the wave winding formula and will provide wave wound armatures satisfying the Relation 25.

$B_t$ (BARS) WHICH SATISFY THE BRUSH SPACING FORMULA FOR DUPLEX WINDINGS ($m=2$)

| Q | 2 Pole 2/3(2Q+1) | 4 Pole 4/3(2Q+1) | 6 Pole 2(2Q+1) | 8 Pole 8/3(2Q+1) | 10 Pole 10/3(2Q+1) | 12 Pole 4(2Q+1) | 14 Pole 14/3(2Q+1) |
|---|---|---|---|---|---|---|---|
| 1 | 2 | 4 | 6 | 8 | 10 | 12 | 14 |
| 2 | 3⅓ | 6⅔ | *10 | 13⅓ | 16⅔ | 20 | 23⅓ |
| 3 | 4⅔ | 9⅓ | *14 | 18⅔ | 23⅓ | 28 | 32⅔ |
| 4 | 6 | 12 | 18 | 24 | 30 | 36 | 42 |
| 5 | 7⅓ | 14⅔ | *22 | 29⅓ | 36⅔ | 44 | 51⅓ |
| 6 | 8⅔ | 17⅓ | *26 | 34⅔ | 43⅓ | 52 | 60⅔ |
| 7 | 10 | 20 | 30 | 40 | 50 | 60 | 70 |
| 8 | 11⅓ | 22⅔ | *34 | 45⅓ | 56⅔ | 68 | 79⅓ |
| 9 | 12⅔ | 25⅓ | *38 | 50⅔ | 63⅓ | 76 | 88⅔ |
| 10 | 14 | 28 | 42 | 56 | 70 | 84 | 98 |
| 11 | 15⅓ | 30⅔ | *46 | 61⅓ | 76⅔ | 92 | 107⅓ |
| 12 | 16⅔ | 33⅓ | *50 | 66⅔ | 83⅓ | 100 | 116⅔ |
| 13 | 18 | 36 | 54 | 72 | 90 | 108 | 126 |
| 14 | 19⅓ | 38⅔ | *58 | 77⅓ | 96⅔ | 116 | 135⅓ |
| 15 | 20⅔ | 41⅓ | *62 | 82⅔ | 103⅓ | 124 | 144⅔ |
| 16 | 22 | 44 | 66 | 88 | 110 | 132 | 154 |

*Satisfies wave formula also, $C = \dfrac{PN}{2} \pm 1$ $B_t$ (BARS) WHICH SATISFY THE BRUSH SPACING FORMULA FOR TRIPLEX WINDINGS ($m=3$)

| Q | 2 Pole 3/4(2Q+1) | 4 Pole 3/2(2Q+1) | 6 Pole 9/4(2Q+1) | 8 Pole 3(2Q+1) | 10 Pole 15/4(2Q+1) | 12 Pole 9/2(2Q+1) | 14 Pole 21/4(2Q+1) | 16 Pole 6(2Q+1) |
|---|---|---|---|---|---|---|---|---|
| 1 | 2¼ | 4½ | 6¾ | *9 | 11¼ | 13½ | 15¾ | 18 |
| 2 | 3¾ | 7½ | 11¼ | *15 | 18¾ | 22½ | 26¼ | 30 |
| 3 | 5¼ | 10½ | 15¾ | *21 | 26¼ | 31½ | 36¾ | 42 |
| 4 | 6¾ | 13½ | 20¼ | *27 | 33¾ | 40½ | 47¼ | 54 |
| 5 | 8¼ | 16½ | 24¾ | *33 | 41¼ | 49½ | 57¾ | 66 |
| 6 | 9¾ | 19½ | 29¼ | *39 | 48¾ | 58½ | 68¼ | 78 |
| 7 | 11¼ | 22½ | 33¾ | *45 | 56¼ | 67½ | 78¾ | 90 |
| 8 | 12¾ | 25½ | 38¼ | *51 | 63¾ | 76½ | 89¼ | 102 |
| 9 | 14¼ | 28½ | 42¾ | *57 | 71¼ | 85½ | 99¾ | 114 |
| 10 | 15¾ | 31½ | 47¼ | *63 | 78¾ | 94½ | 110¼ | 126 |
| 11 | 17¼ | 34½ | 51¾ | *69 | 86¼ | 103½ | 120¾ | 138 |
| 12 | 18¾ | 37½ | 56¼ | *75 | 93¾ | 112½ | 131¼ | 150 |
| 13 | 20¼ | 40½ | 60¾ | *81 | 101¼ | 121½ | 141¾ | 162 |
| 14 | 21¾ | 43½ | 65¼ | *87 | 108¾ | 130½ | 152¼ | 174 |
| 15 | 23¼ | 46½ | 69¾ | *93 | 116¼ | 139½ | 162¾ | 186 |
| 16 | 24¾ | 49½ | 74¼ | *99 | 123¾ | 148½ | 173¼ | 198 |

*Also satisfies wave formula, $C = \frac{PN}{2} \pm 1$.

The above tables were developed for various values of Q and include many values of $B_t$ which are not integers. As pointed out before, armatures are not built with a fraction of a bar, and these values are shown to illustrate that all values of Q will not satisfy Relation 25.

There are many integers which are not in the tables but which lie between successive integers in any one column. For example, in Table I in the four-pole column, 36 and 44 are successive integers and 38, 40, and 42 lie therebetween. The latter values could be used as total number of bars in machines, but if the brushes are spaced according to the rules herein, they will not be symmetrically spaced $\pi$ apart. However, they will avoid injurious internal circulating currents, but their operating or power current distribution will not be quite balanced. In other words, they will be good operative machines, but they will not have symmetry as regards pole locations in respect to the field and brush locations.

It will be noted that the Relation 25 will be satisfied for any value of Q if the number of poles is equal to $2R(m+1)$ where R is any integer. It will also be seen that any lap wound armature having an odd number of coils per winding per pair of poles and where $m$ is even will satisfy Relation 25

Figures 1, 11, 11A, 12, 13, 22, and 28 are examples of commutation systems designed in accordance with Relations 1, 5, 12, 17, 18, and 19. In addition, Relation 25 for symmetrically spaced brushes is also satisfied by Figures 1, 12, 13, 22, and 28, while Figures 11 and 11A illustrate a system with non-symmetrical brushes. Figure 11 is a wave wound while Figure 11A may be either lap or wave wound. Both Figures 11 and 11A have thirty-eight armature coils or bars and are duplex doubly re-entrant windings.

Figures 12, 13, and 1 show the same wave wound armature with $(m+1)$, $2(m+1)$, and $3(m+1)$ brush elements per set, respectively, i. e., one, two, and three brush elements per brush, respectively. Figures 22 and 28 show lap wound armatures with $(m+1)$ and $2(m+1)$ brush elements per set, i. e., per brush.

Thus far, only the prevention of injurious internal circulating current has been treated herein, and the reduction of injurious external circulating currents has not been specifically considered in order to avoid confusion. External circulating current can flow only in a closed circuit which includes an armature coil or coils and an external circuit (external of the armature and commutator) between brush elements of like polarity. Thus, external circulating currents assume great importance in complete armature circuits, wherein the brush elements of like polarity are joined to common conductors.

From the figures and the preceding discussion, it will be apparent that there will be a transformer induced voltage between any two brush elements of like polarity at regular intervals, if not all the time. For example, in Figure 2, since there is a transformer voltage between the two A bars, the same voltage will exist between brush elements 116 and 120, and if their respective separate external leads (not shown) were directly joined, injurious external circulating current would flow as a result thereof. An examination of Figure 1 shows that for the one position of the armature illustrated, many pairs of like polarity brush elements will have transformer induced voltages between them. For example, the two A bars under brush 106 have transformer voltage between them because the coils connected between them are in commutation regions and have maximum transformer voltage induced in them. The same voltage will occur between brush elements 258 and 260 and also between 258 and 262. Transformer voltages between brush elements of like polarity are not confined to pairs of elements at one brush position. Transformer voltages may also exist between a pair of like polarity brush elements located in different commutation regions. Thus, it can be seen that in order to complete the armature circuit, brush elements of like polarity cannot be directly joined to a common conductor without causing injurious external circulating current to flow. Therefore, in order to join all brush elements of like polarity to a common conductor and avoid excessive external circulating current, it is necessary to interpose impedances between the brush elements.

This may be accomplished by connecting an impedance in series with each brush element lead as shown in Figures 1, 12, 13, and 21 to 28 (inclusive). The impedances may be resistors as in Figure 21, or they may be reactances as shown in the other figures, or a combination of both as shown in Figures 1, 13, 24, 25, and 28.

In Figure 21, which shows a three element brush 270, the separate external connections (brush element leads) 272, 274, and 276 of the brush elements 278, 280, and 282 are respectively connected in series with resistors 284, 286, and 288, which are connected to a common lead 290. The resistors will limit not only the external circulating current between any two of the brush elements, but they will also limit the flow of power or operating current which flows through the common lead 290. However, the limiting effect is greater on the circulating current because its path always includes more than one of the resistors in series, while there is never more than one resistor in series with the power or operating current paths in the portion of the circuit shown in Figure 21. In order to force reversal during commutation, the value of each resistor should be such that the average value of operating or power current carried by each of the brush elements is the same. In either an alternating current or a direct current machine, optimum value for each resistor may be determined by running the machine at normal load and varying the resistance until each brush element carries the same average value of operating or power current, which may be checked by an ammeter in each brush element lead. Although a resistor network may be used with either alternating current or direct current machines having a plurality of independent armature windings and segmented brushes, they are power dissipating devices and not as efficient as reactances.

Various brush reactance networks are shown in Figures 1, 12, 13, and 22 to 28 (inclusive). However, certain problems arise in connection with brush impedance networks which, together with remedies therefor, are best illustrated in a two pole duplex doubly re-entrant lap wound armature such as shown in Figure 22, wherein the armature 292 is provided with two windings, $W_a$ and $W_b$, connected to the A and B bars, respectively, of an eighteen bar commutator 294. Since there are an odd number of coils per winding per pair of poles, the brushes 296 and 298 are symmetrically spaced to avoid the formation of current-producing bar junctions by brush elements. Brush 296 is made up of three brush elements 300, 302, and 304, insulated from each other and provided with separate external connections or brush element leads 306, 308, and 310, respectively, which are connected through reactor coils 312, 314, and 316 on separate legs of a three-legged magnetic core 318, to a common conductor 320. Likewise, brush 298 has three brush elements 322, 324, and 326 connected through the coils 328, 330, and 332 of a three-legged reactor 334 to a common lead 336. The reactor coil are so proportioned and disposed on the core that the M. M. F.'s due to the power or operating current are of such strength and directions that they mutually substantially cancel each other resulting in negligible impedance to the power or operating current. In addition, the direction and position of the coils should be such that the M. M. F.'s produced by external circulating current due to transformer induced voltages will produce a relatively high resultant flux in the core legs thus providing relatively high impedance to external circulating currents. For example, the reactor coils in series with the brush elements may have the same number of turns and be wound in the same direction as shown. If at a given instant, the power or operating current is in the direction of the feathered arrows 338, the M. M. F.'s due to the power or operating current are indicated by the full arrow heads 340, and their resultant will be substantially zero. On the other hand, the M. M. F.'s due to external circulating current which may be indicated by the half arrows 342, at a particular instant to produce flux in the core resulting in a high impedance to the external circulating currents, especially if the core is operated below saturation.

Other reactor core designs may be employed as long as the M. M. F.'s due to power current substantially cancel each other to produce a resultant M. M. F. of substantially zero value and the resultant M. M. F.'s due to the external circulating currents produce sufficient flux resulting in a high impedance to the external circulating currents. Another core variation is shown in Figure 23 wherein the reactor coils for all of the brush elements are on the same core.

Figures 26, 27:
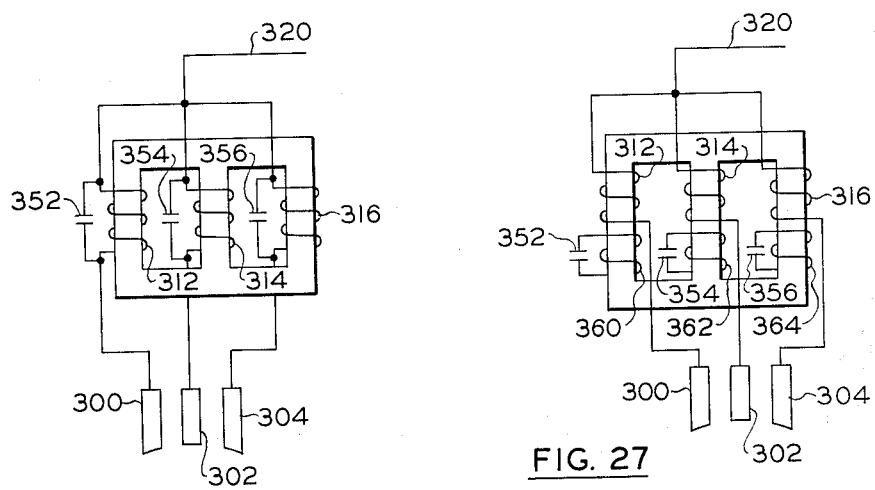

The inductive reactors exercise too rigid a control on the power current. In the armature position of Figure 22, brush element 302 is the only element of brush 296 in contact with an A bar while both elements 300 and 304 are contacting B bars. Therefore, of the total power current through leads 320 and 336, each of the elements 300 and 304 should carry ¼, and element 302 should carry ½ the power current. However since the turns-ratio is 1:1 for the three reactor coils, they will tend to hold the instantaneous power current through each brush element equal or in this case ⅓ of the power current. To relieve this coercion of the power current by the reactor, resistors 346, 348, and 350 may be provided as in Figures 24 and 25, or condensers 352, 354, and 356 may be shunted across the reactor coils either directly (Figure 26) or by transformer action (Figure 27). In Figure 27 the reactor coils 312, 314, and 316 are respectively inductively coupled as primary windings to secondary windings 360, 362, and 364, across which the condensers are connected.

In Figure 1, the end terminals of each of the reactor windings 124, 126, 128, 134, 136, and 138 are connected to brush elements between which there is potential which may be termed a principal transformer voltage because it is continuous and exists all of the time at those elements. Principal transformer voltages occur only between brush elements of the same brush set which elements can be simultaneously centered on different commutator bars of any one winding. This will occur only where a multiple greater than one of $(m+1)$ brush elements per set is employed. The center-tapped reactor windings of Figure 1 may be wound on individual magnetic cores or they may be on a common core similar to that of the two-legged reactor 366 in Figure 13 which is also employed to substantially eliminate external circulating currents due to principal transformer voltages. Transformer voltages which appear only a part of the time between any two brush elements may be termed residual transformer voltages and impedance to the resulting external circulating currents is offered by reactors having as many legs as brushes per set such as reactor 130 in Figures 1, 12, and 13 and the reactors in Figures 22 to 28 (inclusive). The six-legged reactor 368 in Figure 28 serves to substantially prevent the flow of external circulating currents due to both principal and residual transformer voltages.

The brush impedance networks exemplified herein, not only substantially prevent the flow of external circulating currents without appreciably impeding the power current, but also aid in reversing the current in the coils undergoing commutation. In addition, the energy stored in the leakage reactance of the coil undergoing commutation is not dissipated in the form of heat between the brushes and commutator. This energy is stored in the brush element reactor during the reversal and is given up to the leakage field after the reversal. While generally reactive networks are better suited for alternating current, the reactive brush impedance network connected to the brush elements in Figure 12 operates very efficiently in either direct current or alternating current machines of the type shown in Figure 12 to aid current reversal during commutation without heat dissipation and will help to subdue commutation fundamentals and harmonics generated in a machine employing segmented brush sets and a plurality of independent windings.

It will be appreciated that the principles of design and structure of brush element impedance networks described herein are not confined to specific examples or types illustrated, but are equally applicable to any machine, direct current or alternating current, having a plurality of brush elements and a plurality of independent closed armature windings, regardless of the number of independent armature windings, the number of poles, or the number of elements per brush.

The various necessary relations for the avoidance of injurious junctions and the prevention of injurious circulating current flow have been developed herein without specific consideration given to changes in relative size and position of the various components due to commutator wear. Systems with flat-faced commutators present no problems since regular shaped components will maintain their comparative relations regardless of the amount of wear. However, from a practical standpoint, change in the diameter of cylindrical commutators due to wear or other causes presents a serious problem. It is quite evident that relations between the brush elements and the commutator bars will change in one or another manner with wear in a cylindrical commutator. If the brush elements are set parallel to each other, their lineal spacing remains unchanged while the angular spacing increases as the commutator diameter decreases with wear. If the brush elements are set radially, the lineal spacing decreases while the angular spacing remains fixed as the commutator diameter decreases. The angular spacing of the commutator bars remains constant and the lineal distance between bars decreases at the commutator surface as the diameter decreases. Since changes do occur in the comparative relations, brush element thickness and spacing designed to prevent injurious junctions on a new (unworn) commutator may form such junctions after the commutator diameter is reduced by wear or other causes.

The effect of commutator wear is predictable in advance and compensation therefor may be made if some reasonable wear allowance is assumed and the diameter of the old or worn commutator is taken into consideration and employed to modify the relations developed and enumerated hereinbefore. This disclosure will not be burdened with the details of the development and evolution of the relations as modified by wear allowance and hereinafter disclosed.

With regard to Relations 1 and 5 they may be modified to compensate for commutator wear as follows:

(26) $[(m+1)a - m]D_b + S_b \geq [ma - (m-1)]D_{cn} - S_c$

(27) $[(m+1)a - 1]D_b - S_b \leq (ma - 1)D_{co} + S_c$ where $D_{cn}$ is the distance between centers of adjacent commutator bars in a new or unworn commutator, $D_{co}$ is the same measurement in an old or worn commutator, and $a$ is the number of basic brush groups $(m+1)$ at a brush position. When the number of brush elements at a brush position is $(m+1)$ or less, the value of $a$ shall be one.

Constants may be added to the small sides of Relations 26 and 27 in the same manner as hereinbefore applied to Relations 1 and 5 to form equations from which the following formulas and relations for $D_b$ and $T_b$, allowing for wear of the commutator, may be obtained.

(28) $D_b = \dfrac{m}{m+1} \left[ \dfrac{(ma - m + 1)D_{cn} + (ma - 1)D_{co}}{m(2a - 1)} \right]$

(29)
$T_b \leq (ma - m + 1)\left[ \dfrac{a(m+1) - (m-1)}{(m+1)(2a-1)} - 1 \right] D_{cn} +$ $(ma - 1)\left[ \dfrac{a(m+1) - (m-1)}{(m+1)(2a-1)} \right] D_{co} + S_c$ In the case where each brush element is set radially, the brush element relations, if wear is to be compensated for, are governed by the worn diameter only, and Relations 1 and 5 may be used so long as $D_c$ is assigned a value based on the anticipated diameter of the old or worn commutator. Wear allowance, when radial brush elements are employed, may also be made using Relations 26 and 27 and assigning the value of $D_{co}$ to $D_{cn}$ in Relation 26. Thus $D_{cn}$ and $D_{co}$ will have the same value and will be based on the anticipated worn diameter of the commutator.

Where wear is not a factor as in flat-faced commutators, or if wear is disregarded in a cylindrical commutator, that is, if only a particular fixed diameter of a commutator is being considered, then $D_{cn}$ and $D_{co}$ in the Relations 26, 27, 28, and 29 will be equal, and the relations will collapse to Relations 1, 5, 8, and 10 indicating that where wear is not considered, $a$ is not a factor.

A practical wear allowance is 10 per cent and in such case, $D_{co}$ will be 90 per cent of $D_{cn}$. However, a wear allowance will have been made in any case where $D_{co}$, in the relations, is less than $D_{cn}$ regardless of the amount of the difference.

If wear is to be considered, allowance therefor must be made when obtaining the relations for the proportions and spacings between the brush elements of unlike polarity. Figure 29 illustrates the evolution of the special spacing and brush thickness, and in the interest of clarity shows only a portion of a commutator 370 and two bush groups 372 and 374 of unlike-polarity, windings and poles being excluded from the figure. In this figure, $(m)$ is equal to three and $a$ is equal to two. Thus, the brushes 372 and 374 of unlike-polarity and approximately $\pi$ radians apart, each comprise eight brush elements or two basic groups, $2(m+1)$. The illustration is applicable to both wave and lap windings and the commutator 370 is provided with consecutive repetitive groups of bars ABC, ABC, etc., each separate winding being connected to the same relative bar in each group. Thus, one winding is connected to all the A bars, the second to all the B bars, and the third is connected to all the C bars.

Within the brushes 372 and 374, the brush elements are spaced according to the value of $D_b$ obtained from the Relations 26 and 27 and coincident with the thickest brush obtainable. Although the relations evolved here are valid for the general case, in order to develop them, it is first assumed that the brush elements are parallel to each other within their respective groups and that the groups 372 and 374 are set radially with respect to the commutator.

In order to provide a basis for obtaining the correct spacing of brush elements of unlike polarity and the optimum brush thickness for use therewith, the brush groups must be placed relative to the commutator as follows: Assuming that the commutator 370 in Figure 29 moves counterclockwise in the direction of the arrow 376, the first brush element of the brush 372 should be just breaking contact with a bar of one winding, while a brush element of the brush 374 and $$m\left(\left[\dfrac{C}{P}\right]_i + a\right)$$

bars away should be in contact with a bar of the same winding and just making contact with the bar immediately adjacent clockwise thereof. In addition, the centers of the brush groups 372 and 374 should be as near $\pi$ electrical radians apart as the above disposition will permit. The quantity $$\left[\dfrac{C}{P}\right]_i$$

represents the integer part of the ratio $$\dfrac{C}{P}$$

The above positions are followed in Figure 29 wherein the brush element 378 in the brush 372 is just breaking contact with the C bar 380, and the brush element 382 of the brush 374 is just making contact with the A bar 384. Thus, a CA junction is just being broken under brush element 378 between C and A bars 380 and 386, respectively, while a CA junction is just being made under brush element 382. It will be apparent from the figure that the first CA junction which can be made under brush 372 as the commutator moves counterclockwise is by a brush element 390 between C and A bars 392 and 394, respectively. However, before this can happen, the commutator 370 must move a distance greater than $(amD_{co} + S_c) - [\{a(m+1) - 1\}D_b + T_b]$ While the commutator moves through this distance, CA junctions may be formed by brush elements of the brush 374 without danger of the same number of C and A coils being connected together between brushes 372 and 374. As the commutator moves from the position in the figure, a CA junction is first made under brush 374 by the brush element 382. However, before this junction is broken and upon continued movement of the commutator, another CA junction between C and A bars 396 and 398, respectively, is made by a brush element 400 in the same brush group 374. From the time that the CA junction is first formed by brush element 382 until the CA junction formed by brush element 400 is broken, the commutator moves through a distance equal to $[(a-1)(m+1)D_b + T_b] - [(a-1)mD_{co} + S_c]$ Therefore, the latter distance must be less than the distance $(amD_{co} + S_c) - [\{a(m+1) - 1\}D_b + T_b]$ in order to prevent the formation of CA junctions simultaneously by brush elements in both brushes 372 and 374, and the maximum brush thickness $T_b$ which can be tolerated is governed by the relation:

(30) $(amD_{co}+S_c)-[\{a(m+1)-1\}D_b+T_b] \geqq$
$[(a-1)(m+1)D_b+T_b]-[(a-1)mD_{co}+S_c]$ or the relation:

(31)
$$T_b \leqq (a-\tfrac{1}{2})mD_{co}+S_c-\left[a(m+1)-\left(\tfrac{m}{2}+1\right)\right]D_b$$

or $$T_b \leqq \tfrac{(2a-1)}{2}mD_{co}+S_c-\left[\tfrac{(2a-1)(m+1)-1}{2}\right]D_b$$

In obtaining Relation 31 for $T_b$, the old or worn value for the bar center spacing was used. Thus, the unlike-polarity shorts will not appear until the commutator is worn out. The Relation 30 and 31 are general, covering all types of commutators and brushes including cylindrical and flat-faced commutators, and radial and parallel related brush elements. Thus far, two general Relations 29 and 31, respectively, have been obtained for $T_b$. Both define maximum values of $T_b$ for the prescribed purposes. Of course, they can be smaller, but maximum contact area dictates the thicker brush elements. However, to satisfy in one machine, the conditions for which the Relations 29 and 31 have been developed, the relation whose maximum $T_b$ will be the lesser of the two maximum $T_b$'s should be used.

In order to determine the lesser, relation 31 is subtracted from Relation 29 resulting in the difference:

(32) $\left(\tfrac{m}{2}-1\right)(D_{co}-D_b)$

When $m=2$, the difference is zero, but for all other values of $m$, the difference is a positive number because $D_{co}$ is greater than $D_b$ where less than 50 per cent wear allowance has been made in cases where wear allowance must be considered.

Thus, Relation 31 is the one which will satisfy both Relations 29 and 31. Relations 29 and 31 provide the same brush thickness where $m=2$, because their difference in that case is zero.

The correct spacing between brush elements of unlike-polarity having the maximum permissible brush thickness may be effected as follows: Place a brush element in one commutation region and rotate the armature to a position where the brush element is just breaking a junction between a pair of adjacent bars in a particular order. Next, in a commutation region of opposite polarity, place a brush element so that it is just making a like order junction $$m\left(\left[\tfrac{C}{P}\right]_i+a\right)$$

bars away from the first junction. Then align the two reference brush elements as close to the centers of their respective commutation regions and to combined symmetry with respect to each other and the commutation region centers as is possible by moving one or both brush elements in the proper direction in increments of $D_b$. Next, if required by the design, additional brush elements are placed next to the reference elements and $D_b$ apart. The added elements being so placed that the composite brushs considered together will be as nearly symmetrical with respect to the centers of the commutation regions considered together as possible. It will be appreciated that in order to obtain the benefits of wear allowance, the above procedure should be worked out on paper or on a model using the minimum or worn diameter of the commutator as a basis for the relations.

From Figure 29, it can be determined that the distance between centers of the brush elements 378 and 382 for the maximum permissible $T_b$ is:

(33) $m\left(\left[\tfrac{C}{P}\right]_i+a\right)D_{co}-(T_b-S_c)$ and can be increased or decreased by the amount $$\tfrac{D_b-S_c}{2}$$

provided the brush thickness is reduced accordingly. Thus, the distance between the elements 378 and 382 may be from:

(34) $m\left(\left[\tfrac{C}{P}\right]_i+a\right)D_{co}-(T_b-S_c)-\tfrac{D_b-S_c}{2}$ to

(35) $m\left(\left[\tfrac{C}{P}\right]_i+a\right)D_{co}-(T_b-S_c)+\tfrac{D_b-S_c}{2}$ and between centers of any two brush elements of unlike-polarity the distance may be from:

(36) $m\left(\left[\tfrac{C}{P}\right]_i+a\right)D_{co}-(T_b-S_c)-\tfrac{D_b-S_c}{2} \pm XD_b$ to

(37) $m\left(\left[\tfrac{C}{P}\right]_i+a\right)D_{co}-(T_b-S_c)+\tfrac{D_b-S_c}{2} \pm XD_b$ where X may be zero or an integer.

In Figure 28, the brush element proportions, locations, and spacing are such as to compensate for approximately 5 per cent wear.

Safe zones of unlike-polarity, each of whose extent $T_z$ is equal to the lesser of the maximum $T_b$ obtainable from Relations 29 and 31, and whose centers are

(38) $m\left(\left[\tfrac{C}{P}\right]_i+a\right)D_{co}-(T_z-S_c) \pm XD_z$ apart are merely small safe zones within large safe zones as may be established by Relations 13a and 19 for any particular diameter ranging from the new or unworn to the worn or old diameter.

From this it is apparent that brush elements as determined by Relations 29, 31, and 36, and 37 will fall within large safe zones as determined by Relations 13a and 19 and within the smaller safe zones contained in the large safe zones and determined by the Relations 29, 31, and 38.

It is interesting to note that Relation 31 collapses to Relation 13 when $D_{cn}$ and $D_{co}$ are equal or made equal in the Relation 31.

Wear is compensated for in Relations 24 and 24a by modifying them to

(39) $\tfrac{m-1}{2}D_b+T_b \leqq \left(\tfrac{m-1}{2}\right)D_{co}+S_c$ and

(40) $T_b \leqq \tfrac{m-1}{2}(D_{co}-D_b)+S_c$ respectively.

It should be remembered that $D_b$ contains the terms $D_{cn}$ and $D_{co}$, and where $D_{cn}=D_{co}$, $$D_b=\tfrac{m}{m+1}D_c$$

where $D_c=D_{cn}=D_{co}$.

The brush thickness where $m$ is odd must be determined from the Relation [29, 31, or 40] which gives the smallest maximum $T_b$. The smallest of the maximum $T_b$'s obtained from these three relations is also the extent of the small safe zone contained in the large safe zone determined by Relations 13a and 19. However, in the spacing Relations 36 and 37, $T_b$ is determined from Relations 29 and 31.

It will be seen that the extent and location of the maximum permissible $T_b$ obtained by the wear compensating relations is the overlap between safe zones determined separately for the new unworn commutator and for the old worn commutator.

The safe zones are located in accordance with the required center-to-center spacings of brush elements located in different commutation regions of like and unlike-polarity as developed throughout the specification.

These zones may be determined by substituting $T_z$ and $D_z$ for $T_b$ and $D_b$ in any of the relations herein used to determine maximum permissible brush thickness and location. For example, the following relations may be employed to determine $T_z$ and $D_z$ for any particular size of commutator by making $D_{co}=D_{cn}=D_c$.

(41) $\quad D_z = \dfrac{m}{m+1}\left[\dfrac{(ma-m+1)D_{cn}+(ma-1)D_{co}}{m(2a-1)}\right]$ which, when $D_{co}=D_{cn}=D_c$ reduces to

(42) $\quad D_z = \dfrac{m}{m+1}D_c$

(43) $\quad T_z = (a-\tfrac{1}{2})mD_{co}+S_c-\left[a(m+1)-\left(\dfrac{m}{2}+1\right)\right]D_z$ which for the same condition reduces to (13a) $\quad T_z = \dfrac{D_z}{2}+S_c$

(19) $\quad D_{uz} = m\left(\dfrac{C}{P}\right)_i D_c - \dfrac{D_z}{2} + XD_z$ and in addition when $m$ is odd the lesser of the Relations 13a and

(44) $\quad T_z = \dfrac{m-1}{2}(D_c - D_z) + S_c$ must be satisfied. It will be apparent that Relations 42, 41, 13a, 43, and 44 are derived in the same way as Relations 8, 28, 13, 31, and 24a, respectively.

Wherever at least one brush element of maximum $T_b$ obtainable when satisfying the relations outlined herein for the prevention of injurious junctions has been properly located, the location and the extent of this brush element will be coincident with the location and the extent $T_z$ of a safe zone. Then with a first safe zone so determined as a reference zone, the rest of the commutation region may be divided into safe zones seriatim with respect to the reference zone and their centers $D_z$ apart.

Although specific embodiments have been shown herein, the invention is not confined to such but is applicable to lap or wave wound armatures having any multiplicity of independent closed windings, i. e., a number $m$ of $m$ re-entrant windings, where $m$ is 2 or greater. The invention may be employed in many types of alternating current and direct current electrodynamic machinery, for example, motors, generators, converters, etc.

The invention is best suited and most successful where the armature reaction has been neutralized and where the armature coils and the separate closed windings are uniformly distributed.

Commutation regions as used herein are those regions where the brushes may contact coils undergoing current reversal and usually in motors and generators it is a region where the commutator bars traversing the region are connected to coils having substantially zero speed voltage induced therein.

As contemplated by a phase of the invention, each commutation region is divided into a series of adjacent safe zones extending the length of the region, and a brush element may be placed in any part of a safe zone as long as the brush element does not extend outside the boundaries of its safe zone. This indicates the possibility of using brush elements thinner than the width of the safe zones and placed within the zones but not uniformly spaced with respect to each other. This is operable but less desirable.

Both the use of $y$ $(m+1)$ brush elements per set and the brush impedance network contribute to properly distribute the power or operating current between the separate armature windings and also within each winding. $y$ is the multiple of $(m+1)$ in a brush set and may be any integer including 1.

"Simultaneous" or "concurrent junctions" as used herein are intended to define two or more junctions at different points, which junctions exist at the same time during all or a portion of the duration of each junction, and "power" or "operating current" as used herein defines the useful or desired current, for example, torque producing current in a motor and generated current in a generator.

This application is a continuation-in-part of my co-pending application, Serial No. 696,006, filed September 10, 1946, now Patent No. 2,505,018. This application is also a continuation-in-part of my now abandoned application, Serial No. 105,021, filed July 15, 1949, which in turn is a continuation of my now abandoned application, Serial No. 777,425, filed October 2, 1947, the latter being a continuation-in-part of my co-pending application, Serial No. 696,006, filed September 10, 1946 (Patent No. 2,505,018).

While the form of embodiment of the invention as herein disclosed constitutes a preferred form, it is to be understood that other forms might be adopted, all coming within the scope of the claims which follow.

What is claimed is as follows:

1. In an electrodynamic machine, a commutation system comprising an armature with a plurality of independent closed windings, a commutator having a plurality of sets of successive commutator bars connected to said windings, each bar of a set being connected to a different winding, and each winding being connected to the same relative bar of each set, a plurality of brush elements of one polarity contacting the commutator bars, and a plurality of brush elements of another polarity contacting the commutator bars, each brush element having a contact surface capable of simultaneously contacting adjoining commutator bars, the brush elements being proportioned and located to prevent brush elements of unlike polarity from simultaneously making a plurality of like order junctions between consecutive bars of two windings.

2. In an electrodynamic machine, a commutation system comprising an armature with a plurality of similar independent windings, each having a plurality of coils, a commutator with a plurality of commutator bars, the coils of each winding being connected to a different group of periodically spaced non-adjacent commutator bars, a plurality of brush elements of one polarity contacting the commutator bars and a plurality of brush elements of another polarity contacting the commutator bars, each brush element having a contact surface capable of simultaneously contacting adjoining commutator bars, the brush elements being proportioned and located to prevent brush elements of like polarity from simultaneously making a plurality of unlike order junctions between consecutive bars of two windings.

3. In an electrodynamic machine, a commutation system comprising an armature with a plurality of similar independent windings, each having a plurality of coils, a commutator with a plurality of commutator bars, the coils of each winding being connected to a different group of periodically spaced non-adjacent commutator bars, a plurality of brush elements of one polarity contacting the commutator bars, and a plurality of brush elements of another polarity contacting the commutator bars, each brush element having a contact surface capable of simultaneously contacting adjoining commutator bars, the brush elements being proportioned and located to prevent brush elements of the same polarity from joining two windings at more than one place simultaneously to form a closed circuit of an unequal number of coils in the two windings between the junctions 4. In an electrodynamic machine, a commutation system comprising an armature with a plurality of similar independent windings, each having a plurality of coils, a commutator with a plurality of commutator bars, the coils of each winding being connected to a different group of periodically spaced non-adjacent commutator bars, a plurality of brush elements of one polarity contacting the commutator bars, and a plurality of brush elements of another polarity contacting the commutator bars, each brush element having a contact surface capable of simultaneously contacting adjoining commutator bars, the brush elements being proportioned and located to prevent brush elements of unlike polarity from joining two windings at more than one place simultaneously to form a closed circuit of an equal number of coils in the two windings between the junctions.

5. In an electrodynamic machine, a commutation system comprising an armature with a plurality of similar independent windings, each having a plurality of coils, a commutator with a plurality of commutator bars, the coils of each winding being connected to a different group of periodically spaced non-adjacent commutator bars, a plurality of brush elements of one polarity contacting the commutator bars, a plurality of brush elements of another polarity contacting the commutator bars, each brush element having a contact surface capable of simultaneously contacting adjoining commutator bars, the brush elements being so proportioned and located that only brush elements of like polarity can join two windings at more than one place simultaneously to form a closed circuit of an equal number of coils in said two windings between the junctions, and impedance means coupled between brush elements of like polarity for substantially eliminating external circulating currents between brush elements of like polarity.

6. In an electrodynamic machine, a commutation system comprising an armature with a plurality of similar independent windings, each having a plurality of coils, a commutator with a plurality of commutator bars, the coils of each winding being connected to a different group of periodically spaced non-adjacent commutator bars, a plurality of brush elements of one polarity contacting the commutator bars, a plurality of brush elements of another polarity contacting the commutator bars, each brush element having a contact surface capable of simultaneously contacting adjoining commutator bars, the brush elements being proportioned and located to prevent brush elements of unlike polarity from joining two windings at more than one place simultaneously to form a closed circuit of an equal number of coils in the two windings between the junctions, and impedance means coupled between brush elements of like polarity for substantially eliminating external circulating currents between brush elements of like polarity.

7. In an electrodynamic machine, a commutation system comprising an armature with a plurality of similar independent windings, each having a plurality of coils, a commutator with a plurality of commutator bars, the coils of each winding being connected to a different group of periodically spaced non-adjacent commutator bars, a plurality of brush elements of one polarity contacting the commutator bars, a plurality of brush elements of another polarity contacting the commutator bars, each brush element having a contact surface capable of simultaneously contacting adjoining commutator bars, the brush elements being proportioned and located to prevent brush elements of unlike polarity from joining two windings at more than one place simultaneously to form a closed circuit of an equal number of coils in the two windings between the junctions, a common conductor, and impedance means for coupling brush elements of like polarity to the common conductor while restricting the flow of external circulating current between brush elements of like polarity, said impedance means comprising resistance.

8. In an electrodynamic machine, a commutation system comprising an armature with a plurality of similar independent windings, each having a plurality of coils, a commutator with a plurality of commutator bars, the coils of each winding being connected to a different group of periodically spaced non-adjacent commutator bars, a plurality of brush elements of one polarity contacting the commutator bars, a plurality of brush elements of another polarity contacting the commutator bars, each brush element having a contact surface capable of simultaneously contacting adjoining commutator bars, the brush elements being proportioned and located to prevent brush elements of unlike polarity from joining two windings at more than one place simultaneously to form a closed circuit of an equal number of coils in the two windings between the junctions, a common conductor, and impedance means for coupling brush elements of like polarity to the common conductor while restricting the flow of external circulating current between brush elements of like polarity, said impedance means comprising capacitance.

9. In an electrodynamic machine, a commutation system comprising an armature with a plurality of similar independent windings, each having a plurality of coils, a commutator with a plurality of commutator bars, the coils of each winding being connected to a different group of periodically spaced non-adjacent commutator bars, a plurality of brush elements of one polarity contacting the commutator bars, a plurality of brush elements of another polarity contacting the commutator bars, each brush element having a contact surface capable of simultaneously contacting adjoining commutator bars, the brush elements being proportioned and located to prevent brush elements of unlike polarity from joining two windings at more than one place simultaneously to form a closed circuit of an equal number of coils in the two windings between the junctions, a common conductor, and impedance means for coupling brush elements of like polarity to the common conductor while restricting the flow of external circulating current between brush elements of like polarity, said impedance means comprising inductance.

10. A commutation system comprising a plurality of similar independent closed windings, a commutator having a plurality of sets of successive commutator bars connected to said windings, each bar of a set being connected to a different winding and each winding being connected to the same relative bar of each set, and a plurality of brush elements contacting the commutator, said brush elements being insulated from each other, each brush element having a contact surface capable of simultaneously contacting adjoining commutator bars, and the spacing and proportions of said brush elements being such as to satisfy the following relations:

$$[(m+1)a - m]D_b + S_b \geq [ma - (m-1)]D_{cn} - S_c$$
$$[(m+1)a - 1]D_b - S_b \leq (ma - 1)D_{co} + S_c$$

where $D_{co} < D_{cn}$; $m$ is the number of independent armature windings; $a$ is the number of basic brush element groups at a brush position; $D_b$ is the distance between the centers of adjacent brush elements; $S_b$ is the gap distance between adjacent brush elements; $D_{cn}$ is the distance between centers of adjacent commutator bars on a new or unworn commutator; $D_{co}$ is the distance between centers of adjacent commutator bars when a predetermined radial wear has taken place in the commutator; and $S_c$ is the distance between the nearest sides of adjacent commutator bars; all of said space and distance relations being along the commutator surface.

11. A commutation system comprising a plurality of similar independent closed windings, a commutator having a plurality of sets of successive commutator bars connected to said windings, each bar of a set being connected to a different winding and each winding being connected to the same relative bar of each set, means establishing commutation regions along said commutator, and a plurality of brush elements of different polarities contacting the commutator in said regions, said brush elements being insulated from each other, each brush element having a contact surface capable of simultaneously contacting adjoining commutator bars, and impedance means coupled between brush elements of like polarity for substantially eliminating external circulating currents between brush elements of like polarity, the spacing and proportions of said brush elements relative to one another and to the commutator in each commutation region being such as to prevent like polarity short circuits at that commutation region before and after the occurrence of relative wear between the brush elements by satisfying the following relations:

$$[(m+1)a-m]D_b + S_b \geq [ma-(m-1)]D_{cn} - S_c$$
$$[(m+1)a-1]D_b - S_b \leq (ma-1)D_{co} + S_c$$

where $D_{co} < D_{cn}$; $m$ is the number of independent armature windings; $a$ is the number of basic brush element groups at a brush position; $D_b$ is the distance between the centers of adjacent brush elements; $S_b$ is the gap distance between adjacent brush elements; $D_{cn}$ is the distance between centers of adjacent commutator bars on a new or unworn commutator; $D_{co}$ is the distance between centers of adjacent commutator bars when a predetermined radial wear has taken place in the commutator; and $S_c$ is the distance between the nearest sides of adjacent commutator bars; all of said space and distance relations being along the commutator surface.

12. A commutation system comprising a plurality of similar independent closed windings, a commutator having a plurality of sets of successive commutator bars connected to said windings, each bar of a set being connected to a different winding and each winding being connected to the same relative bar of each set, means establishing commutation regions along said commutator, and a plurality of brush elements contacting the commutator in said regions, said brush elements being insulated from each other, each brush element having a contact surface capable of simultaneously contacting adjoining commutator bars, and the spacing and proportions of said brush elements being such as to prevent like polarity short circuits caused by brush elements in one commutation region and by brush elements in different commutation regions by satisfying the following relations:

$$[(m+1)a-m]D_b + S_b \geq [ma-(m-1)]D_{cn} - S_c$$
$$[(m+1)a-1]D_b - S_b \leq (ma-1)D_{co} + S_c$$

where $D_{co} < D_{cn}$, and each brush element of any given polarity having a position with respect to the commutator bars in one commutation region that in another commutation region is assumed by or related by said relations to a brush element of like polarity; wherein $m$ is the number of independent armature windings; $a$ is the number of basic brush element groups at a brush position; $D_b$ is the distance between the centers of adjacent brush elements; $S_b$ is the gap distance between adjacent brush elements; $D_{cn}$ is the distance between centers of adjacent commutator bars on a new or unworn commutator; $D_{co}$ is the distance between centers of adjacent commutator bars when a predetermined radial wear has taken place in the commutator; $S_c$ is the distance between the nearest sides of adjacent commutator bars; and $T_b$ is the brush element thickness measured along the line of relative commutator movement; all of said space and distance relations being along the commutator surface.

13. In an electrodynamic machine, a commutation system comprising an armature with a plurality of similar independent closed windings, each having a plurality of coils, a commutator with a plurality of commutator bars, the coils of each winding being connected to a different group of periodically spaced non-adjacent commutator bars, a plurality of brush elements of different polarities for contacting the commutator bars, each brush element having a contact surface capable of simultaneously contacting adjoining commutator bars, the spacing, position, and proportions of said brush elements being such that the following relations are satisfied:

$$D_b + S_b \geq D_c - S_c$$
$$mD_b - S_b \leq (m-1)D_c + S_c$$
$$D_b - T_b + S_c \geq T_b - S_c$$

and all brush elements of like polarity are an integral number of units apart, and brush elements of unlike polarity are spaced a non-integral number of said units apart, where each of said units is equal to $D_b$, the terms in said relations being defined as follows: $D_b$ is the distance between the centers of adjacent brush elements; $S_b$ is the gap distance between adjacent brush elements; $D_c$ is the distance between centers of adjacent commutator bars; $S_c$ is the distance between the nearest sides of adjacent commutators bars; $m$ is the number of independent armature windings; and $T_b$ is the brush element thickness measured along the line of relative commutator movement; all of said space and distance relations being along the commutator surface.

14. In an electrodynamic machine having a plurality of field poles, a commutation system comprising an armature with a plurality of similar independent windings, each having a plurality of coils, a commutator with a plurality of commutator bars, the coils of each winding being connected to a different group of periodically spaced non-adjacent commutator bars, a plurality of brush elements of different polarities for contacting the commutator bars, each brush element having a contact surface capable of simultaneously contacting adjoining commutator bars, the spacing, position, and proportions of said brush elements being in accordance with the following relations:

$$D_b + S_b \geq D_c - S_c$$
$$mD_b - S_b \leq (m-1)D_c + S_c$$
$$D_b - T_b + S_c \geq T_b - S_c$$

and the distance between centers of any two brush elements of unlike polarity being within the range extending from $$m\left(\frac{C}{P}\right)_i D_c - D_b + \frac{S_c}{2} \pm XD_b$$

to $$m\left(\frac{C}{P}\right)_i D_c - \frac{S_c}{2} \pm XD_b$$

both inclusive, the terms in said relations being defined as follows: $D_b$ is the distance between the centers of adjacent brush elements; $S_b$ is the gap distance between adjacent brush elements; $D_c$ is the distance between centers of adjacent commutator bars; $S_c$ is the distance between the nearest sides of adjacent commutator bars; $m$ is the number of independent armature windings; $T_b$ is the brush element thickness measured along the line of relative commutator movement; $C$ is the number of coils per armature winding; $P$ is the number of poles;

$$\left(\frac{C}{P}\right)_i$$

is the integer part of the ratio $$\frac{C}{P}$$

and $X$ is either zero or an integer; all of said space and distance relations being along the commutator surface.

15. In a electrodynamic machine having a plurality of field poles, a commutation system comprising an armature with a plurality of similar independent windings, each having a plurality of coils, a commutator with a plurality of commutator bars, the coils of each winding being connected to a different group of periodically spaced non-adjacent commutator bars, a plurality of brush elements of one polarity, a plurality of brush elements of the opposite polarity, said brush elements being in contact with the commutator bars, each brush element having a contact surface capable of simultaneously contacting adjoining commutator bars, the spacing, position, and proportions of said brush elements being such as to prevent like and unlike polarity short circuits before and after the occurrence of relative wear between the brush elements and the commutator by satisfying the following relations:

$$[(m+1)a - m]D_b + S_b \geq [ma - (m-1)]D_{cn} - S_c$$
$$[(m+1)a - 1]D_b - S_b \leq (ma - 1)D_{co} + S_c$$
$$(amD_{co} + S_c) - [\{a(m+1) - 1\}D_b + T_b] \geq$$
$$[(a-1)(m+1)D_b + T_b] - [(a-1)mD_{co} + S_c]$$
$$\left(\frac{m-1}{2}\right)D_b + T_b \leq \left(\frac{m-1}{2}\right)D_{co} + S_c$$

and the distance between centers of any two brush elements of unlike polarity being a value in the range:

$$m\left(\left[\frac{C}{P}\right]_i + a\right)D_{co} - (T_b - S_c) - \frac{D_b - S_c}{2} \pm XD_b$$

to $$m\left(\left[\frac{C}{P}\right]_i + a\right)D_{co} - (T_b - S_c) + \frac{D_b - S_c}{2} \pm XD_b$$

both inclusive, the terms in said relations being defined as follows: $m$ is the number of independent armature windings; $a$ is the number of basic brush element groups at a brush position; $D_b$ is the distance between the centers of adjacent brush elements; $S_b$ is the gap distance between adjacent brush elements; $D_{cn}$ is the distance between centers of adjacent commutator bars on a new or unworn commutator; $D_{co}$ is the distance between centers of adjacent commutator bars when a predetermined radial wear has taken place in the commutator; $S_c$ is the distance between the nearest sides of adjacent commutator bars; $T_b$ is the brush element thickness measured along the line of relative commutator movement; $C$ is the number of coils per armature winding; $P$ is the number of poles;

$$\left(\frac{C}{P}\right)_i$$

is the integer part of the ratio $$\frac{C}{P}$$

and X is either zero or an integer; all of said space and distance relations being along the commutator surface.

16. In an electrodynamic machine having a plurality of field poles, a commutation system comprising an armature with a plurality of independent windings, a commutator having a plurality of sets of successive commutator bars connected to said windings, each bar of a set being connected to a different winding, and each winding being connected to the same relative bar of each set, a plurality of brush elements of one polarity, a plurality of brush elements of another polarity, said brush elements being in contact with the commutator bars, each brush element having a contact surface capable of simultaneously contacting adjoining commutator bars, the spacing, position, and proportions of said brush elements being in accordance with the following relations:

$$[(m+1)a - m]D_b + S_b \geq [ma - (m-1)]D_{cn} - S_c$$
$$[(m+1)a - 1]D_b - S_b \leq (ma - 1)D_{co} + S_c$$
$$(amD_{co} + S_c) - [\{a(m+1) - 1\}D_b + T_b] \geq$$
$$[(a-1)(m+1)D_b + T_b] - [(a-1)mD_{co} + S_c]$$

and the distance between centers of any two brush elements of unlike polarity being a value in the range:

$$m\left(\left[\frac{C}{P}\right]_i + a\right)D_{co} - (T_b - S_c) - \frac{D_b - S_c}{2} \pm XD_b$$

to $$m\left(\left[\frac{C}{P}\right]_i + a\right)D_{co} - (T_b - S_c) + \frac{D_b - S_c}{2} \pm XD_b$$

both inclusive, the terms in said relations being defined as follows: $m$ is the number of independent armature windings; $a$ is the number of basic brush element groups at a brush position; $D_b$ is the distance between the centers of adjacent brush elements; $S_b$ is the gap distance between adjacent brush elements; $D_{cn}$ is the distance between centers of adjacent commutator bars on a new or unworn commutator; $D_{co}$ is the distance between centers of adjacent commutator bars when a predetermined radial wear has taken place in the commutator; $S_c$ is the distance between the nearest sides of adjacent commutator bars; $T_b$ is the brush element thickness measured along the line of relative commutator movement; $C$ is the number of coils per armature windings; $P$ is the number of poles;

$$\left(\frac{C}{P}\right)_i$$

is the integer part of the ratio $$\frac{C}{P}$$

and X is either zero or an integer; all of said space and distance relations being along the commutator surface.

17. In an electrodynamic machine having a plurality of field poles, a commutation system comprising an armature with a plurality of independent windings, a commutator having a plurality of sets of successive commutator bars connected to said windings, each bar of a set being connected to a different winding, and each winding being connected to the same relative bar of each set, a plurality of brush elements of one polarity, a plurality of brush elements of another polarity, said brush elements being in contact with the commutator bars, each brush element having a contact surface capable of simultaneously contacting adjoining commutator bars, and impedance means coupled between elements of like polarity for substantially eliminating external circulating currents between brush elements or like polarity, the spacing, position, and proportions of all said brush elements being such as to prevent like and unlike polarity short circuits before and after the occurrence of relative wear between the brush elements and the commutator by satisfying the following relations:

$$[(m+1)a - m]D_b + S_b \geq [ma - (m-1)]D_{cn} - S_c$$
$$[(m+1)a - 1]D_b - S_b \leq (ma - 1)D_{co} + S_c$$
$$(amD_{co} + S_c) - [\{a(m+1) - 1\}D_b + T_b] \geq$$
$$[(a-1)(m+1)D_b + T_b] - [(a-1)mD_{co} + S_c]$$

and the distance between centers of any two brush elements of unlike polarity being a value in the range:

$$m\left(\left[\frac{C}{P}\right]_i + a\right)D_{co} - (T_b - S_c) - \frac{D_b - S_c}{2} \pm XD_b$$

to $$m\left(\left[\frac{C}{P}\right]_i + a\right)D_{co} - (T_b - S_c) + \frac{D_b - S_c}{2} \pm XD_b$$

both inclusive, the terms in said relations being defined as follows: $m$ is the number of independent armature windings; $a$ is the number of basic brush element groups at a brush position; $D_b$ is the distance between the centers of adjacent brush elements; $S_b$ is the gap distance between adjacent brush elements; $D_{cn}$ is the distance between centers of adjacent commutator bars on a new or unworn commutator; $D_{co}$ is the distance between centers of adjacent commutator bars when a predetermined radial wear has taken place in the commutator; $S_c$ is the distance between the nearest sides of adjacent commutator bars; $T_b$ is the brush element thickness measured along the line of relative commutator movement; C is the number of coils per armature winding; P is the number of poles;

$$\left(\frac{C}{P}\right)_i$$

is the integer part of the ratio $$\frac{C}{P}$$

and X is either zero or an integer; all of said space and distance relations being along the commutator surface.

18. In an electrodynamic machine, a commutation system comprising an armature with a plurality of similar independent windings, each having a plurality of coils, a commutator with a plurality of commutator bars, the coils of each winding being connected to a different group of periodically spaced non-adjacent commutator bars, and a plurality of brush elements of both polarities for contacting the commutator bars, each brush element having a contact surface capable of simultaneously contacting adjoining commutator bars, the spacing, position, and proportions of said brush elements being such as to prevent like and unlike polarity short circuits before and after the occurrence of relative wear between the brush elements and the commutator by satisfying the following relations:

$$[(m+1)a-m]D_b+S_b \geqq [ma-(m-1)]D_{cn}-S_c$$

$$[(m+1)a-1]D_b-S_b \leqq (ma-1)D_{co}+S_c$$

$$(amD_{co}+S_c)-[\{a(m+1)-1\}D_b+T_b] \geqq$$
$$[(a-1)(m+1)D_b+T_b]-[(a-1)mD_{co}+S_c]$$

and brush elements of unlike polarity being spaced to prevent their joining two windings at more than one place simultaneously to form a closed circuit of an equal number of coils in the two windings between the junctions, the terms in said relations being defined as follows: $m$ is the number of independent armature windings; $a$ is the number of basic brush element groups at a brush position; $D_b$ is the distance between the centers of adjacent brush elements; $S_b$ is the gap distance between adjacent brush elements; $D_{cn}$ is the distance between centers of adjacent commutator bars on a new or unworn commutator; $D_{co}$ is the distance between centers of adjacent commutator bars when a predetermined radial wear has taken place in the commutator; $S_c$ is the distance between the nearest sides of adjacent commutator bars; and $T_b$ is the brush element thickness measured along the line of relative commutator movement; all of said space and distance relations being along the commutator surface.

19. In an electrodynamic machine, a commutation system comprising an armature with a plurality of similar independent windings, each having a plurality of coils, a commutator with a plurality of commutator bars, the coils of each winding being connected to a different group of periodically spaced non-adjacent commutator bars, a plurality of brush elements of both polarities for contacting the commutator bars, each brush element having a contact surface capable of simultaneously contacting adjoining commutator bars, and impedance means coupled between brush elements of like polarity for substantially eliminating external circulating currents between brush elements of like polarity, the spacing, position, and proportions of all said brush elements being such that:

$$[(m+1)a-m]D_b+S_b \geqq [ma-(m-1)]D_{cn}-S_c$$

$$[(m+1)a-1]D_b-S_b \leqq (ma-1)D_{co}+S_c$$

$$(amD_{co}+S_c)-[\{a(m+1)-1\}D_b+T_b] \geqq$$
$$[(a-1)(m+1)D_b+T_b]-[(a-1)mD_{co}+S_c]$$

and brush elements of unlike polarity being spaced to prevent their joining two windings at more than one place simultaneously to form a closed circuit of an equal number of coils in the two windings between the junctions, the terms in said relations being defined as follows: $m$ is the number of independent armature windings; $a$ is the number of basic brush element groups at a brush position; $D_b$ is the distance between the centers of adjacent brush elements; $S_b$ is the gap distance between adjacent brush elements; $D_{cn}$ is the distance between centers of adjacent commutator bars on a new or unworn commutator; $D_{co}$ is the distance between centers of adjacent commutator bars when a predetermined radial wear has taken place in the commutator; $S_c$ is the distance between the nearest sides of adjacent commutator bars; and $T_b$ is the brush element thickness measured along the line of relative commutator movement; all of said space and distance relations being along the commutator surface.

20. In an electrodynamic machine having a plurality of field poles operable to establish commutation regions of opposite polarities along the commutator of an armature, a commutation system comprising an armature with a plurality of similar independent closed windings, each having a plurality of coils, a commutator having a plurality of sets of successive commutator bars connected to said windings, each bar of a set being connected to a different winding and each winding being connected to the same relative bar of each set, and a plurality of brush elements for contacting the commutator bars in said commutation regions, each brush element having a contact surface capable of simultaneously contacting adjoining commutator bars, said brush elements being spaced to prevent like and unlike polarity short circuits by locating them wholly within safe zones whose extent and location are governed by the following relations:

$$D_z = \frac{m}{m+1}D_c$$

$T_z$ is equal to the lesser one of the following two values, $$\left(\frac{D_z}{2}+S_c\right)$$

or $$\left[\frac{m-1}{2}(D_c-D_z)+S_c\right]$$

the centers of any two safe zones of like polarity being an integral number of units apart and the centers of any two safe zones of unlike polarity being a non-integral number of units apart, each unit being equal to $D_z$, the terms in said relations being defined as follows: $D_z$ is the distance between centers of adjacent safe zones; $m$ is the number of independent armature windings; $D_c$ is the distance between centers of adjacent commutator bars; $T_z$ is the extent of a safe zone; and $S_c$ is the distance between the nearest sides of adjacent commutator bars; all of said space and distance relations being along the commutator surface.

21. In an electrodynamic machine having a plurality of field poles operable to establish commutation regions of opposite polarities along the commutator of an armature, a commutation system comprising an armature with a plurality of similar independent closed windings, each having a plurality of coils, a commutator having a plurality of sets of successive commutator bars connected to said windings, each bar of a set being connected to a different winding and each winding being connected to the same relative bar of each set, and a plurality of brush elements for contacting the commutator bars in said commutation regions, each brush element having a contact surface capable of simultaneously contacting adjoining commutator bars, said brush elements being spaced to prevent like and unlike polarity short circuits by locating them wholly within safe zones whose extent and location are governed by the following relations:

$$D_z = \frac{m}{m+1}D_c$$

$$D_{uz} = m\left(\frac{C}{P}\right)_i D_c - \frac{D_z}{2} \pm XD_z$$

and $T_z$ is equal to the lesser one of the following two values, $$\left(\frac{D_z}{2} + S_c\right)$$

or $$\left[\frac{m-1}{2}(D_c - D_z) + S_c\right]$$

the terms in said relations being defined as follows: $D_z$ is the distance between centers of adjacent safe zones; $m$ is the number of independent armature windings; $D_c$ is the distance between centers of adjacent commutator bars; $D_{uz}$ is the distance between centers of any two safe zones of opposite polarity; $C$ is the number of coils per armature winding; $P$ is the number of poles;

$$\left(\frac{C}{P}\right)_i$$

is the integer part of the ratio $$\frac{C}{P}$$

X is either zero or an integer; $T_z$ is the extent of a safe zone; and $S_c$ is the distance between the nearest sides of adjacent commutator bars; all of said space and distance relations being along the commutator surface.

22. In an electrodynamic machine having a plurality of field poles operable to establish commutation regions of opposite polarities along the commutator of an armature, a commutation system comprising an armature with a plurality of similar independent windings, each having a plurality of coils, a commutator having a plurality of sets of successive commutator bars connected to said windings, each bar of a set being connected to a different winding and each winding being connected to the same relative bar of each set, and a plurality of brush elements for contacting the commutator bars in said commutation regions, each brush element having a contact surface capable of simultaneously contacting adjoining commutator bars, said brush elements being spaced to prevent like and unlike polarity short circuits by locating them wholly within safe zones whose extent and location are governed by the following relations:

$$D_z = \frac{m}{m+1} D_c$$

$$T_z = \frac{D_z}{2} + S_c$$

the centers of any two safe zones of like polarity being an integral number of units apart and the centers of any two safe zones of unlike polarity being a non-integral number of units apart, each unit being equal to $D_z$, the terms in said relations being defined as follows: $D_z$ is the distance between centers of adjacent safe zones; $m$ is the number of independent armature windings; $D_c$ is the distance between centers of adjacent commutator bars; $T_z$ is the extent of a safe zone; and $S_c$ is the distance between the nearest sides of adjacent commutator bars; all of said space and distance relations being along the commutator surface.

23. In an electrodynamic machine having a plurality of field poles operable to establish commutation regions of opposite polarities along the commutator of an armature, a commutation system comprising an armature with a plurality of similar independent windings, each having a plurality of coils, a commutator having a plurality of sets of successive commutator bars connected to said windings, each bar of a set being connected to a different winding and each winding being connected to the same relative bar of each set, a plurality of brush elements for contacting the commutator bars in said commutation regions, each brush element having a contact surface capable of simultaneously contacting adjoining commutator bars, said brush elements being located wholly within safe zones, and impedance means coupled between brush elements of like polarity for substantially eliminating external circulating currents between brush elements of like polarity, the extent and location of said safe zones being governed by the following relations:

$$D_z = \frac{m}{m+1} D_c$$

$$T_z = \frac{D_z}{2} + S_c$$

the centers of any two safe zones of unlike polarity being a non-integral number of units apart, each unit being equal to $D_z$, the terms in said relations being defined as follows: $D_z$ is the distance between centers of adjacent safe zones; $m$ is the number of independent armature windings; $D_c$ is the distance between centers of adjacent commutator bars; $T_z$ is the extent of a safe zone; and $S_c$ is the distance between the nearest sides of adjacent commutator bars; all of said space and distance relations being along the commutator surface.

24. In an electrodynamic machine having a plurality of field poles operable to establish commutation regions of opposite polarities along the commutator of an armature, a commutation system comprising an armature with a plurality of similar independent windings, each having a plurality of coils, a commutator having a plurality of sets of successive commutator bars connected to said windings, each bar of a set being connected to a different winding and each winding being connected to the same relative bar of each set, and a plurality of brush elements for contacting the commutator bars in said commutation regions, each brush element having a contact surface capable of simultaneously contacting adjoining commutators bars, said brush elements being located wholly within safe zones whose extent and location are governed by the following relations:

$$D_z = \frac{m}{m+1} D_c$$

$$T_z = \frac{D_z}{2} + S_c$$

$$D_{uz} = m\left(\frac{C}{P}\right)_i D_c - \frac{D_z}{2} \pm XD_z$$

the terms in said relations being defined as follows: $D_z$ is the distance between centers of adjacent safe zones; $m$ is the number of independent armature windings; $D_c$ is the distance between centers of adjacent commutator bars; $T_z$ is the extent of a safe zone; $S_c$ is the distance between the nearest sides of adjacent commutator bars; $D_{uz}$ is the distance between centers of any two safe zones of opposite polarity; $C$ is the number of coils per armature winding; $P$ is the number of poles;

$$\left(\frac{C}{P}\right)_i$$

is the integer part of the ratio $$\frac{C}{P}$$

and X is either zero or an integer; all of said space and distance relations being along the commutator surface.

25. In an electrodynamic machine having a plurality of field poles operable to establish commutation regions of opposite polarities along the commutator of an armature, a commutation system comprising an armature with a plurality of similar independent windings, each having a plurality of coils, a commutator having a plurality of sets of successive commutator bars connected to said windings, each bar of a set being connected to a different winding and each winding being connected to the same relative bar of each set, a plurality of brush elements for contacting the commutator bars in said commutation regions, each brush element having a contact surface capable of simultaneously contacting adjoining commutator bars, said brush elements being located wholly within safe zones, and impedance means coupled between brush elements of like polarity for substantially eliminating external circulating currents between brush elements of like polarity, the extent and location of said safe zones being governed by the following relations:

$$D_z = \frac{m}{m+1} D_c$$

$$T_z = \frac{D_z}{2} + S_c$$

$$D_{uz} = m \left(\frac{C}{P}\right)_i D_c - \frac{D_z}{2} \pm X D_z$$

the terms in said relations being defined as follows: $D_z$ is the distance between centers of adjacent safe zones; $m$ is the number of independent armature windings; $D_c$ is the distance between centers of adjacent commutator bars; $T_z$ is the extent of a safe zone; $S_c$ is the distance between the nearest sides of adjacent commutator bars; $D_{uz}$ is the distance between centers of any two safe zones of opposite polarity; $C$ is the number of coils per armature winding; $P$ is the number of poles;

$$\left(\frac{C}{P}\right)_i$$

is the integer part of the ratio $$\frac{C}{P}$$

and X is either zero or an integer; all of said space and distance relations being along the commutator surface.

26. In an electrodynamic machine having a plurality of field poles operable to establish commutation regions of opposite polarities along the commutator of an armature, a commutation system comprising an armature with a plurality of similar independent windings, each having a plurality of coils, a commutator having a plurality of sets of successive commutator bars connected to said windings, each bar of a set being connected to a different winding and each winding being connected to the same relative bar of each set, a plurality of brush elements for contacting the commutator bars in said commutation regions, each brush element having a contact surface capable of simultaneously contacting adjoining commutator bars, said brush elements being located wholly within safe zones, and impedance means for coupling brush elements of like polarity to a common conductor while restricting the flow of external circulating current between brush elements of like polarity, said impedance means comprising resistance, the extent and location of said safe zones being governed by the following relations:

$$D_z = \frac{m}{m+1} D_c$$

$$T_z = \frac{D_z}{2} + S_c$$

$$D_{uz} = m \left(\frac{C}{P}\right)_i D_c - \frac{D_z}{2} \pm X D_z$$

the terms in said relations being defined as follows: $D_z$ is the distance between centers of adjacent safe zones; $m$ is the number of independent armature windings; $D_c$ is the distance between centers of adjacent commutator bars; $T_z$ is the extent of a safe zone; $S_c$ is the distance between the nearest sides of adjacent commutator bars; $D_{uz}$ is the distance between centers of any two safe zones of opposite polarity; C is the number of coils per armature winding; P is the number of poles;

$$\left(\frac{C}{P}\right)_i$$

is the integer part of the ratio $$\frac{C}{P}$$

and X is either zero or an integer; all of said space and distance relations being along the commutator surface.

27. In an electrodynamic machine having a plurality of field poles operable to establish commutation regions of opposite polarities along the commutator of an armature, a commutation system comprising an armature with a plurality of similar independent windings, each having a plurality of coils, a commutator having a plurality of sets of successive commutator bars connected to said windings, each bar of a set being connected to a different winding and each winding being connected to the same relative bar of each set, a plurality of brush elements for contacting the commutator bars in said commutation regions, each brush element having a contact surface capable of simultaneously contacting adjoining commutator bars, said brush elements being located wholly within safe zones, and impedance means for coupling brush elements of like polarity to a common conductor while restricting the flow of external circulating current between brush elements of like polarity, said impedance means comprising inductance, the extent and location of said safe zones being governed by the following relations:

$$D_z = \frac{m}{m+1} D_c$$

$$T_z = \frac{D_z}{2} + S_c$$

$$D_{uz} = m \left(\frac{C}{P}\right)_i D_c - \frac{D_z}{2} \pm X D_z$$

the terms in said relations being defined as follows: $D_z$ is the distance between centers of adjacent safe zones; $m$ is the number of independent armature windings; $D_c$ is the distance between centers of adjacent commutator bars; $T_z$ is the extent of a safe zone; $S_c$ is the distance between the nearest sides of adjacent commutator bars; $D_{uz}$ is the distance between centers of any two safe zones of opposite polarity; C is the number of coils per armature winding; P is the number of poles;

$$\left(\frac{C}{P}\right)_i$$

is the integer part of the ratio $$\frac{C}{P}$$

and X is either zero or an integer; all of said space and distance relations being along the commutator surface.

28. In an electrodynamic machine having a plurality of field poles operable to establish commutation regions of opposite polarities along the commutator of an armature, a commutation system comprising an armature with a plurality of similar independent windings, each having a plurality of coils, a commutator having a plurality of sets of successive commutator bars connected to said windings, each bar of a set being connected to a different winding and each winding being connected to the same relative bar of each set, a plurality of brush elements for contacting the commutator bars in said commutation regions, each brush element having a contact surface capable of simultaneously contacting adjoining commutator bars, said brush elements being located wholly within safe zones, and impedance means for coupling brush elements of like polarity to a common conductor while restricting the flow of external circulating current between brush elements of like polarity, said impedance means comprising capacitance, the extent and location of said safe zones being governed by the following relations:

$$D_z = \frac{m}{m+1} D_c$$

$$T_z = \frac{D_z}{2} + S_c$$

$$D_{uz} = m\left(\frac{C}{P}\right)_i D_c - \frac{D_z}{2} \pm X D_z$$

the terms in said relations being defined as follows: $D_z$ is the distance between centers of adjacent safe zones; $m$ is the number of independent armature windings; $D_c$ is the distance between centers of adjacent commutator bars; $T_z$ is the extent of a safe zone; $S_c$ is the distance between the nearest sides of adjacent commutator bars; $D_{uz}$ is the distance between centers of any two safe zones of opposite polarity; C is the number of coils per armature winding; P is the number of poles;

$$\left(\frac{C}{P}\right)_i$$

is the integer part of the ratio $$\frac{C}{P}$$

and X is either zero or an integer; all of said space and distance relations being along the commutator surface.

29. A commutation system comprising a plurality of similar independent closed windings, a commutator having a plurality of sets of successive commutator bars connected to said windings, each bar of a set being connected to a different winding and each winding being connected to the same relative bar of each set, means establishing commutation regions along said commutator, and a plurality of brush elements contacting the commutator in said regions, said brush elements being insulated from each other, each brush element having a contact surface capable of simultaneously contacting adjoining commutator bars, the spacing and proportions of said brush elements relative to one another and to the commutator in each commutation region being such as to prevent like polarity short circuits at that commutation region before and after the occurrence of relative wear between the brush elements by satisfying the following relations:

$$[(m+1)a - m]D_b + S_b \geq [ma - (m-1)]D_{cn} - S_c$$
$$[(m+1)a - 1]D_b - S_b \leq (ma-1)D_{co} + S_c$$

where $D_{co} < D_{cn}$; $m$ is the number of independent armature windings; $a$ is the number of basic brush element groups at a brush position, and is more than 1; $D_b$ is the distance between the centers of adjacent brush elements; $S_b$ is the gap distance between adjacent brush elements; $D_{cn}$ is the distance between centers of adjacent commutator bars on a new or unworn commutator; $D_{co}$ is the distance between centers of adjacent commutator bars when a predetermined radial wear has taken place in the commutator; and $S_c$ is the distance between the nearest sides of adjacent commutator bars; all of said space and distance relations being along the commutator surface.

30. A commutation system comprising a plurality of similar independent closed windings, a commutator having a plurality of sets of successive commutator bars connected to said windings, each bar of a set being connected to a different winding and each winding being connected to the same relative bar of each set, and a plurality of brush elements of different polarities contacting the commutator, said brush elements being insulated from each other, each brush element having a contact surface capable of simultaneously contacting adjoining commutator bars, and impedance means coupled between brush elements of like polarity for substantially eliminating external circulating currents between brush elements of like polarity, the spacing and proportions of said brush elements being such as to satisfy the following relations:

$$[(m+1)a - m]D_b + S_b \geq [ma - (m-1)]D_{cn} - S_c$$
$$[(m+1)a - 1]D_b - S_b \leq (ma-1)D_{co} + S_c$$

where $D_{co} < D_{cn}$; $m$ is the number of independent armature windings; $a$ is the number of basic brush element groups at a brush position, and is more than 1; $D_b$ is the distance between the centers of adjacent brush elements; $S_b$ is the gap distance between adjacent brush elements; $D_{cn}$ is the distance between centers of adjacent commutator bars on a new or unworn commutator; $D_{co}$ is the distance between centers of adjacent commutator bars when a predetermined radial wear has taken place in the commutator; and $S_c$ is the distance between the nearest sides of adjacent commutator bars; all of said space and distance relations being along the commutator surface.

31. In an electrodynamic machine, a commutation system comprising an armature with a plurality of similar independent closed windings, each having a plurality of coils, a commutator with a plurality of commutator bars, the coils of each winding being connected to a different group of periodically spaced non-adjacent commutator bars, and a plurality of brush elements of different polarities for contacting the commutator bars, each brush element having a contact surface capable of simultaneously contacting adjoining commutator bars, the spacing, position, and proportions of said brush elements being such as to prevent like and unlike polarity short circuits by satisfying the following relations:

$$D_b + S_b \geq D_c - S_c$$

$$mD_b - S_b \leq (m-1)D_c + S_c$$

$$D_b - T_b + S_c \geq T_b - S_c$$

$$T_b \leq \frac{m-1}{2}(D_c - D_b) + S_c$$

and all brush elements of like polarity are an integral number of units apart, and brush elements of unlike polarity are spaced a non-integral number of said units apart, where each of said units is equal to $D_b$, the terms in said relations being defined as follows: $D_b$ is the distance between the centers of adjacent brush elements; $S_b$ is the gap distance between adjacent brush elements; $D_c$ is the distance between centers of adjacent commutator bars; $S_c$ is the distance between the nearest sides of adjacent commutator bars; $m$ is the number of independent armature windings; and $T_b$ is the brush element thickness measured along the line of relative commutator movement; all of said space and distance relations being along the commutator surface.

32. In an electrodynamic machine having a plurality of field poles, a commutation system comprising an armature with a plurality of similar independent windings, each having a plurality of coils, a commutator with a plurality of commutator bars, the coils of each winding being connected to a different group of periodically spaced non-adjacent commutator bars, and a plurality of brush elements of different polarities for contacting the commutator bars, each brush element having a contact surface capable of simultaneously contacting adjoining commutator bars, the spacing, position, and proportions of said brush elements being such as to prevent like and unlike polarity short circuits by satisfying the following relations:

$$D_b + S_b \geq D_c - S_c$$

$$mD_b - S_b \leq (m-1)D_c + S_c$$

$$D_b - T_b + S_c \geq T_b - S_c$$

$$T_b \leq \frac{m-1}{2}(D_c - D_b) + S_c$$

and the distance between centers of any two brush elements of unlike polarity being within the range extending from $$m\left(\frac{C}{P}\right)_i D_c - D_b + \frac{S_c}{2} \pm X D_b$$

to $$m\left(\frac{C}{P}\right)_i D_c - \frac{S_c}{2} \pm X D_b$$

both inclusive, the terms in said relations being defined as follows: $D_b$ is the distance between the centers of adjacent brush elements; $S_b$ is the gap distance between adjacent brush elements; $D_c$ is the distance between centers of adjacent commutator bars; $S_c$ is the distance between the nearest sides of adjacent commutator bars; $m$ is the number of independent armature windings; $T_b$ is the brush element thickness measured along the line of relative commutator movement; C is the number of coils per armature winding; P is the number of poles;

$$\left(\frac{C}{P}\right)_i$$

is the integer part of the ratio $$\frac{C}{P}$$

and X is either zero or an integer; all of said space and distance relations being along the commutator surface.

33. In an electrodynamic machine having a plurality of field poles, a commutation system comprising an armature with a plurality of similar independent windings, each having a plurality of coils, a commutator with a plurality of commutator bars, the coils of each winding being connected to a different group of periodically spaced non-adjacent commutator bars, and a plurality of brush elements of both polarities for contacting the commutator bars, each brush element having a contact surface capable of simultaneously contacting adjoining commutator bars, the spacing, position, and proportions of said brush elements being such as to prevent like and unlike polarity short circuits by satisfying the following relations:

$$D_b + S_b \geqq D_c - S_c$$
$$mD_b - S_b \leqq (m-1)D_c + S_c$$
$$D_b - T_b + S_c \geqq T_b - S_c$$

and $$B_t = \frac{\frac{P}{2}(2Q+1)m}{m+1}$$

wherein $m$ is the number of independent armature windings; $D_b$ is the distance between the centers of adjacent brush elements; $S_b$ is the gap distance between adjacent brush elements; $D_c$ is the distance between centers of adjacent commutator bars; $S_c$ is the distance between the nearest sides of adjacent commutator bars; $T_b$ is the brush element thickness measured along the line of relative commutator movement; $B_t$ is the total number of bars; P is the number of poles; and Q is an integer; all of said space and distance relations being along the commutator surface.

34. In an electrodynamic machine, a commutation system comprising an armature with a plurality of similar independent closed windings, each having a plurality of coils, a commutator with a plurality of commutator bars, the coils of each winding being connected to a different group of periodically spaced non-adjacent commutator bars, and a plurality of brush elements of different polarities for contacting the commutator bars, each brush element having a contact surface capable of simultaneously contacting adjoining commutator bars, the spacing, position, and proportions of said brush elements being such as to prevent like and unlike polarity short circuits by satisfying the following relations:

$$D_b + S_b \geqq D_c - S_c$$
$$mD_b - S_b \leqq (m-1)D_c + S_c$$
$$D_b - T_b + S_c \geqq T_b - S_c$$

and all brush elements of like polarity are an integral number of units apart, and brush elements of unlike polarity are spaced a non-integral number of said units apart, where each of said units is equal to $D_b$, the terms in said relations being defined as follows: $D_b$ is the distance between the centers of adjacent brush elements; $S_b$ is the gap distance between adjacent brush elements; $D_c$ is the distance between centers of adjacent commutator bars; $S_c$ is the distance between the nearest sides of adjacent commutator bars; $m$ is the number of independent armature windings; and $T_b$ is the brush element thickness measured along the line of relative commutator movement; all of said space and distance relations being along the commutator surface.

35. In an electrodynamic machine having a plurality of field poles, a commutation system comprising an armature with a plurality of similar independent windings, each having a plurality of coils a commutator with a plurality of commutator bars, the coils of each winding being connected to a different group of periodically spaced non-adjacent commutator bars, and a plurality of brush elements of different polarities for contacting the commutator bars, each brush element having a contact surface capable of simultaneously contacting adjoining commutator bars, the spacing, position, and proportions of said brush elements being such as to prevent like and unlike polarity short circuits by satisfying the following relations:

$$D_b + S_b \geqq D_c - S_c$$
$$mD_b - S_b \leqq (m-1)D_c + S_c$$
$$D_b - T_b + S_c \geqq T_b - S_c$$

and the distance between centers of any two brush elements of unlike polarity being within the range extending from $$m\left(\frac{C}{P}\right)_i D_c - D_b + \frac{S_c}{2} \pm X D_b$$

to $$m\left(\frac{C}{P}\right)_i D_c - \frac{S_c}{2} \pm X D_b$$

both inclusive, the terms in said relations being defined as follows: $D_b$ is the distance between the centers of adjacent brush elements; $S_b$ is the gap distance between adjacent brush elements; $D_c$ is the distance between centers of adjacent commutator bars; $S_c$ is the distance between the nearest sides of adjacent commutator bars; $m$ is the number of independent armature windings; $T_b$ is the brush element thickness measured along the line of relative commutator movement; C is the number of coils per armature winding; P is the number of poles;

$$\left(\frac{C}{P}\right)_i$$

is the integer part of the ratio $$\frac{C}{P}$$

and X is either zero or an integer; all of said space and distance relations being along the commutator surface.

36. In an electrodynamic machine having a plurality of field poles operable to establish commutation regions of opposite polarities along the commutator of an armature, a commutation system comprising an armature with a plurality of similar independent windings, each having a plurality of coils, a commutator having a plurality of sets of successive commutator bars connected to said windings, each bar of a set being connected to a different winding and each winding being connected to the same relative bar of each set, and a plurality of brush elements for contacting the commutator bars in said commutation regions, each brush element having a contact surface capable of simultaneously contacting adjoining commutator bars, said brush elements being spaced to prevent like and unlike polarity short circuits by locating them wholly within safe zones whose extent and location are governed by the following relations:

$$D_z = \frac{m}{m+1} D_c$$

$$T_z = \frac{D_z}{2} + S_c$$

$$D_{uz} = m\left(\frac{C}{P}\right)_i D_c - \frac{D_z}{2} \pm X D_z$$

the terms in said relations being defined as follows: $D_z$ is the distance between centers of adjacent safe zones; $m$ is the number of independent armature windings; $D_c$ is the distance between centers of adjacent commutator bars; $T_z$ is the extent of a safe zone; $S_c$ is the distance between the nearest sides of adjacent commutator bars; $D_{uz}$ is the distance between centers of any two safe zones of opposite polarity; C is the number of coils per armature winding; P is the number of poles;

$$\left(\frac{C}{P}\right)_i$$

is the integer part of the ratio $$\frac{C}{P}$$

and X is either zero or an integer; all of said space and distance relations being along the commutator surface.

References Cited in the file of this patent
UNITED STATES PATENTS
1,059,134     Fornander _____ Apr. 15, 1913